United States Patent
Benedek et al.

(10) Patent No.: US 9,063,798 B2
(45) Date of Patent: *Jun. 23, 2015

(54) CROSS-ENVIRONMENT COMMUNICATION USING APPLICATION SPACE API

(71) Applicant: Z124, George Town (KY)

(72) Inventors: Laszlo Csaba Benedek, Richmond (CA); Octavian Chincisan, Richmond Hill (CA)

(73) Assignee: Z124, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,662

(22) Filed: Oct. 31, 2013

(65) Prior Publication Data

US 2014/0059566 A1    Feb. 27, 2014

Related U.S. Application Data

(63) Continuation of application No. 13/247,885, filed on Sep. 28, 2011, now Pat. No. 8,726,294, which is a continuation-in-part of application No. 13/217,099, filed on Aug. 24, 2011.

(Continued)

(51) Int. Cl.
  *G06F 9/54*    (2006.01)
  *G06Q 10/10*    (2012.01)

(52) U.S. Cl.
  CPC *G06F 9/54* (2013.01); *G06F 9/544* (2013.01); *G06F 9/548* (2013.01)

(58) Field of Classification Search
None
See application file for complete search history.

(56) References Cited

U.S. PATENT DOCUMENTS 5,396,630 A    3/1995    Banda et al.
5,673,403 A    9/1997    Brown et al.

(Continued)

FOREIGN PATENT DOCUMENTS

JP    7-219903    8/1995
JP    08-115144    5/1996

(Continued)

OTHER PUBLICATIONS

Haselton, "Celio Announces Redfly Smart Phone Dock, Software for Windows PCs," LAPTOP Magazine, Jan. 8, 2009, [retrieved on Feb. 11, 2014], 4 pages. Retrieved from: blog.laptopmag.com/redfly-launches-smartphone-dock-software-for-windows-pcs.

(Continued)

*Primary Examiner* — Andy Ho
*Assistant Examiner* — Abdou Seye
(74) *Attorney, Agent, or Firm* — Sheridan Ross P.C.

(57) ABSTRACT

A mobile computing device with a mobile operating system and desktop operating system running concurrently and independently on a shared kernel without virtualization. The mobile operating system provides a mobile user experience while the desktop operating system provides a full desktop user experience when the mobile computing device is docked to a secondary terminal environment. Applications of the desktop operating system communicate with applications and services of the mobile operating system through a cross-environment communication framework. The cross-environment communication framework may include application programming interfaces through which categories of applications can communicate across a multiple operating system computing environment through category-specific remote communication calls. The mobile computing device may be a smartphone running the Android mobile operating system and a full desktop Linux distribution on a modified Android kernel.

21 Claims, 18 Drawing Sheets

Related U.S. Application Data

(60) Provisional application No. 61/389,117, filed on Oct. 1, 2010, provisional application No. 61/507,199, filed on Jul. 13, 2011, provisional application No. 61/507,201, filed on Jul. 13, 2011, provisional application No. 61/507,203, filed on Jul. 13, 2011, provisional application No. 61/507,206, filed on Jul. 13, 2011, provisional application No. 61/507,209, filed on Jul. 13, 2011.

(56) References Cited

U.S. PATENT DOCUMENTS

| | | | |
|---|---|---|---|
| 5,764,984 | A | 6/1998 | Loucks |
| 5,874,928 | A | 2/1999 | Kou |
| 6,018,340 | A | 1/2000 | Butler et al. |
| 6,108,715 | A | 8/2000 | Leach et al. |
| 6,157,959 | A | 12/2000 | Bonham et al. |
| 6,178,503 | B1 | 1/2001 | Madden et al. |
| 6,182,158 | B1 | 1/2001 | Kougiouris et al. |
| 6,260,075 | B1 | 7/2001 | Cabrero et al. |
| 6,477,585 | B1 | 11/2002 | Cohen et al. |
| 6,486,890 | B1 | 11/2002 | Harada et al. |
| 6,507,336 | B1 | 1/2003 | Lunsford |
| 6,573,913 | B1 | 6/2003 | Butler et al. |
| 6,694,368 | B1 | 2/2004 | An et al. |
| 6,826,703 | B2 | 11/2004 | Kawano et al. |
| 6,917,963 | B1 | 7/2005 | Burton et al. |
| 6,927,908 | B2 | 8/2005 | Stark |
| 6,961,941 | B1 | 11/2005 | Nelson et al. |
| 6,970,173 | B2 | 11/2005 | Ciolac |
| 7,007,240 | B1 | 2/2006 | Anderson et al. |
| 7,069,519 | B1 | 6/2006 | Okude et al. |
| 7,127,723 | B2 | 10/2006 | Endo et al. |
| 7,284,203 | B1 | 10/2007 | Meeks et al. |
| 7,453,465 | B2 | 11/2008 | Schmieder et al. |
| 7,478,341 | B2 | 1/2009 | Dove |
| 7,489,503 | B2 | 2/2009 | Maatta |
| 7,565,535 | B2 | 7/2009 | Roberts et al. |
| 7,681,134 | B1 | 3/2010 | Grechishkin et al. |
| 7,705,799 | B2 | 4/2010 | Niwa |
| 7,880,728 | B2 | 2/2011 | de los Reyes et al. |
| 7,949,633 | B1 | 5/2011 | Shaver et al. |
| 7,950,008 | B2 | 5/2011 | Bhide et al. |
| 7,960,945 | B1 | 6/2011 | Onorato et al. |
| 8,194,001 | B2 | 6/2012 | Miller et al. |
| 8,397,245 | B2 | 3/2013 | Filali-Adib et al. |
| 8,704,777 | B2 | 4/2014 | Small et al. |
| 2002/0010844 | A1 | 1/2002 | Noel et al. |
| 2002/0130888 | A1 | 9/2002 | Perry et al. |
| 2002/0157001 | A1 | 10/2002 | Huang et al. |
| 2002/0158811 | A1 | 10/2002 | Davis |
| 2003/0001848 | A1 | 1/2003 | Doyle et al. |
| 2003/0020954 | A1 | 1/2003 | Udom et al. |
| 2003/0079010 | A1 | 4/2003 | Osborn |
| 2003/0079205 | A1 | 4/2003 | Miyao et al. |
| 2003/0115443 | A1 | 6/2003 | Cepulis et al. |
| 2003/0131143 | A1 | 7/2003 | Myers |
| 2003/0174172 | A1 | 9/2003 | Thomas et al. |
| 2003/0177285 | A1 | 9/2003 | Hunt et al. |
| 2003/0179541 | A1 | 9/2003 | Sullivan |
| 2003/0226116 | A1 | 12/2003 | Kuwata et al. |
| 2004/0137855 | A1 | 7/2004 | Wiley et al. |
| 2004/0141085 | A1 | 7/2004 | Nickel et al. |
| 2004/0226023 | A1 | 11/2004 | Tucker |
| 2005/0083642 | A1 | 4/2005 | Senpuku et al. |
| 2005/0193267 | A1 | 9/2005 | Liu et al. |
| 2005/0216594 | A1* | 9/2005 | O'Brien et al. ............... 709/227 |
| 2005/0237587 | A1 | 10/2005 | Nakamura |
| 2005/0246505 | A1 | 11/2005 | McKenney et al. |
| 2005/0248501 | A1 | 11/2005 | Kim |
| 2006/0005187 | A1 | 1/2006 | Neil |
| 2006/0010314 | A1 | 1/2006 | Xu |
| 2006/0031572 | A1 | 2/2006 | Feuerstein et al. |
| 2006/0107020 | A1 | 5/2006 | Stillwell, Jr. et al. |
| 2006/0136828 | A1 | 6/2006 | Asano |
| 2006/0139862 | A1 | 6/2006 | Wang et al. |
| 2006/0183505 | A1 | 8/2006 | Willrich |
| 2006/0187142 | A1 | 8/2006 | Lesniak |
| 2006/0227806 | A1 | 10/2006 | Tseng |
| 2006/0248404 | A1 | 11/2006 | Lindsay et al. |
| 2007/0005661 | A1 | 1/2007 | Yang |
| 2007/0014295 | A1 | 1/2007 | Fernandes et al. |
| 2007/0022155 | A1 | 1/2007 | Owens et al. |
| 2007/0033260 | A1 | 2/2007 | Grouzdev et al. |
| 2007/0050751 | A1* | 3/2007 | Husmann et al. ............. 717/105 |
| 2007/0067769 | A1 | 3/2007 | Geisinger |
| 2007/0085759 | A1 | 4/2007 | Lee et al. |
| 2007/0111750 | A1 | 5/2007 | Stohr et al. |
| 2007/0136356 | A1 | 6/2007 | Smith et al. |
| 2007/0156729 | A1 | 7/2007 | Shaylor |
| 2007/0164923 | A1 | 7/2007 | Kanai et al. |
| 2007/0182663 | A1 | 8/2007 | Biech |
| 2007/0198760 | A1 | 8/2007 | Han |
| 2007/0271522 | A1 | 11/2007 | Son et al. |
| 2007/0285401 | A1 | 12/2007 | Ohki et al. |
| 2007/0288941 | A1 | 12/2007 | Dunshea et al. |
| 2008/0024388 | A1 | 1/2008 | Bruce |
| 2008/0057910 | A1 | 3/2008 | Thoresson et al. |
| 2008/0062625 | A1 | 3/2008 | Batio |
| 2008/0082815 | A1 | 4/2008 | Kawano et al. |
| 2008/0090525 | A1 | 4/2008 | Joo |
| 2008/0119237 | A1 | 5/2008 | Kim |
| 2008/0119731 | A1 | 5/2008 | Becerra et al. |
| 2008/0126762 | A1 | 5/2008 | Kelley et al. |
| 2008/0134061 | A1 | 6/2008 | Banerjee et al. |
| 2008/0155103 | A1 | 6/2008 | Bailey |
| 2008/0244599 | A1 | 10/2008 | Hodson et al. |
| 2008/0282181 | A1 | 11/2008 | Ferguson |
| 2008/0291283 | A1 | 11/2008 | Achiwa et al. |
| 2008/0299951 | A1 | 12/2008 | Karkanias et al. |
| 2009/0037649 | A1 | 2/2009 | Xu |
| 2009/0055749 | A1 | 2/2009 | Chatterjee et al. |
| 2009/0083829 | A1 | 3/2009 | Peterson |
| 2009/0089569 | A1 | 4/2009 | Baribault et al. |
| 2009/0100429 | A1 | 4/2009 | Thoelke et al. |
| 2009/0109468 | A1 | 4/2009 | Barclay et al. |
| 2009/0119580 | A1 | 5/2009 | Rohrabaugh et al. |
| 2009/0138818 | A1 | 5/2009 | Nemoto |
| 2009/0158299 | A1 | 6/2009 | Carter |
| 2009/0164930 | A1 | 6/2009 | Chen et al. |
| 2009/0176571 | A1 | 7/2009 | Sternberg |
| 2009/0217071 | A1 | 8/2009 | Huang et al. |
| 2009/0219254 | A1 | 9/2009 | Lai et al. |
| 2009/0249247 | A1 | 10/2009 | Tseng et al. |
| 2009/0249331 | A1 | 10/2009 | Davis et al. |
| 2009/0256780 | A1 | 10/2009 | Small et al. |
| 2009/0257657 | A1 | 10/2009 | Temmermans et al. |
| 2009/0278806 | A1 | 11/2009 | Duarte et al. |
| 2009/0298546 | A1 | 12/2009 | Kim et al. |
| 2009/0305743 | A1 | 12/2009 | Gouesbet et al. |
| 2009/0313440 | A1 | 12/2009 | Kim et al. |
| 2009/0327560 | A1 | 12/2009 | Yalovsky |
| 2010/0005396 | A1 | 1/2010 | Nason et al. |
| 2010/0007603 | A1 | 1/2010 | Kirkup |
| 2010/0013863 | A1 | 1/2010 | Harris |
| 2010/0037166 | A1 | 2/2010 | Chandrasekar et al. |
| 2010/0046026 | A1 | 2/2010 | Heo |
| 2010/0049775 | A1 | 2/2010 | Rajawat |
| 2010/0060549 | A1 | 3/2010 | Tsern |
| 2010/0063994 | A1 | 3/2010 | Cook et al. |
| 2010/0064228 | A1 | 3/2010 | Tsern |
| 2010/0064244 | A1 | 3/2010 | Kilpatrick et al. |
| 2010/0064536 | A1 | 3/2010 | Caskey et al. |
| 2010/0066763 | A1 | 3/2010 | Macdougall et al. |
| 2010/0079355 | A1 | 4/2010 | Kilpatrick, II et al. |
| 2010/0085274 | A1 | 4/2010 | Kilpatrick et al. |
| 2010/0085301 | A1 | 4/2010 | Cohen et al. |
| 2010/0085382 | A1 | 4/2010 | Lundqvist et al. |
| 2010/0097386 | A1 | 4/2010 | Kim et al. |
| 2010/0107163 | A1 | 4/2010 | Lee |
| 2010/0110480 | A1 | 5/2010 | Satake |
| 2010/0122271 | A1 | 5/2010 | Labour et al. |
| 2010/0149121 | A1 | 6/2010 | Alexander et al. |

(56) References Cited

U.S. PATENT DOCUMENTS

| | | |
|---|---|---|
| 2010/0157518 A1 | 6/2010 | Ladouceur et al. |
| 2010/0164836 A1 | 7/2010 | Liberatore |
| 2010/0177019 A1 | 7/2010 | Jeong et al. |
| 2010/0177047 A1 | 7/2010 | Brenneman et al. |
| 2010/0207903 A1 | 8/2010 | Kim et al. |
| 2010/0211769 A1 | 8/2010 | Shankar et al. |
| 2010/0245256 A1 | 9/2010 | Estrada et al. |
| 2010/0246119 A1 | 9/2010 | Collopy et al. |
| 2010/0250975 A1 | 9/2010 | Gill et al. |
| 2010/0251233 A1 | 9/2010 | Majewski et al. |
| 2010/0319008 A1 | 12/2010 | Ho |
| 2010/0321275 A1 | 12/2010 | Hinckley et al. |
| 2011/0012858 A1 | 1/2011 | Brookes et al. |
| 2011/0016299 A1 | 1/2011 | Galicia et al. |
| 2011/0016301 A1 | 1/2011 | Galicia et al. |
| 2011/0018901 A1 | 1/2011 | Boorman et al. |
| 2011/0025625 A1 | 2/2011 | Hirako |
| 2011/0034214 A1 | 2/2011 | Hong et al. |
| 2011/0063192 A1 | 3/2011 | Miller et al. |
| 2011/0093691 A1 | 4/2011 | Galicia et al. |
| 2011/0093836 A1 | 4/2011 | Galicia et al. |
| 2011/0096014 A1 | 4/2011 | Fuyuno et al. |
| 2011/0102314 A1 | 5/2011 | Roux |
| 2011/0113329 A1 | 5/2011 | Pusateri |
| 2011/0115713 A1 | 5/2011 | Altman et al. |
| 2011/0115737 A1 | 5/2011 | Fuyuno et al. |
| 2011/0126216 A1 | 5/2011 | Galicia et al. |
| 2011/0167492 A1 | 7/2011 | Ghosh et al. |
| 2011/0193806 A1 | 8/2011 | Kim et al. |
| 2011/0209102 A1 | 8/2011 | Hinckley et al. |
| 2011/0210922 A1 | 9/2011 | Griffin |
| 2011/0216064 A1 | 9/2011 | Dahl et al. |
| 2011/0225538 A1 | 9/2011 | Oyagi et al. |
| 2011/0239142 A1 | 9/2011 | Steeves et al. |
| 2011/0246904 A1 | 10/2011 | Pinto et al. |
| 2011/0252317 A1 | 10/2011 | Keranen et al. |
| 2011/0260997 A1 | 10/2011 | Ozaki |
| 2011/0267478 A1 | 11/2011 | Jacobs |
| 2011/0273464 A1 | 11/2011 | Brunner et al. |
| 2011/0273475 A1 | 11/2011 | Herz et al. |
| 2011/0289444 A1 | 11/2011 | Winsky |
| 2011/0291964 A1 | 12/2011 | Chambers et al. |
| 2011/0312349 A1 | 12/2011 | Forutanpour |
| 2012/0005602 A1 | 1/2012 | Anttila et al. |
| 2012/0005691 A1 | 1/2012 | Wong et al. |
| 2012/0026069 A1 | 2/2012 | Ohsaki |
| 2012/0060089 A1 | 3/2012 | Heo et al. |
| 2012/0066581 A1 | 3/2012 | Spalink |
| 2012/0066624 A1 | 3/2012 | Kwak et al. |
| 2012/0076197 A1 | 3/2012 | Byford et al. |
| 2012/0081278 A1 | 4/2012 | Freedman |
| 2012/0081353 A1 | 4/2012 | Yusupov et al. |
| 2012/0081354 A1 | 4/2012 | Yusupov et al. |
| 2012/0081380 A1 | 4/2012 | Reeves et al. |
| 2012/0081383 A1 | 4/2012 | Reeves et al. |
| 2012/0081396 A1 | 4/2012 | Yusupov et al. |
| 2012/0084480 A1 | 4/2012 | Reeves et al. |
| 2012/0084481 A1 | 4/2012 | Reeves et al. |
| 2012/0084542 A1 | 4/2012 | Reeves et al. |
| 2012/0084675 A1 | 4/2012 | Sirpal et al. |
| 2012/0084697 A1 | 4/2012 | Reeves |
| 2012/0084791 A1 | 4/2012 | Benedek et al. |
| 2012/0084792 A1 | 4/2012 | Benedek et al. |
| 2012/0084793 A1 | 4/2012 | Reeves et al. |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089906 A1 | 4/2012 | Reeves et al. |
| 2012/0089992 A1 | 4/2012 | Reeves et al. |
| 2012/0094716 A1 | 4/2012 | Reeves |
| 2012/0172088 A1 | 7/2012 | Kirch et al. |
| 2012/0176413 A1 | 7/2012 | Kulik et al. |
| 2012/0188185 A1 | 7/2012 | Cassar |
| 2012/0278747 A1 | 11/2012 | Abraham et al. |
| 2012/0278750 A1 | 11/2012 | Abraham et al. |
| 2013/0019183 A1 | 1/2013 | Reeves et al. |
| 2013/0021262 A1 | 1/2013 | Chen |
| 2013/0024778 A1 | 1/2013 | Reeves et al. |
| 2013/0024812 A1 | 1/2013 | Reeves et al. |
| 2013/0076672 A1 | 3/2013 | Sirpal et al. |
| 2013/0076677 A1 | 3/2013 | Kretz |
| 2013/0076678 A1 | 3/2013 | Kretz |
| 2013/0076679 A1 | 3/2013 | Kretz |
| 2013/0076683 A1 | 3/2013 | Reeves |
| 2013/0079062 A1 | 3/2013 | Sirpal et al. |
| 2013/0080945 A1 | 3/2013 | Reeves |
| 2013/0088411 A1 | 4/2013 | Reeves et al. |
| 2013/0167159 A1 | 6/2013 | Ricci et al. |
| 2013/0219162 A1 | 8/2013 | Reeves et al. |
| 2013/0312106 A1 | 11/2013 | Reeves et al. |

FOREIGN PATENT DOCUMENTS

| | | |
|---|---|---|
| JP | 2008-225546 | 9/2008 |
| KR | 1020020092969 | 12/2002 |
| KR | 100578592 | 5/2006 |
| KR | 1020060081997 | 7/2006 |
| KR | 100616157 | 8/2006 |
| KR | 100883208 | 2/2009 |
| KR | 1020100043434 | 4/2010 |
| WO | WO 2006/075859 | 7/2006 |
| WO | WO 2008/132924 | 11/2008 |

OTHER PUBLICATIONS

McDermott "Porting Android to a new device," Embedded Software, Jan. 28, 2010, 12 pages [retrieved from: http://yidonghan.wordpress.com/2010/01/28/porting-android-to-a-new-device/].

Rebecka & Zingo, "Share memory using ashmem and binder in the android framework," Android Blog, Mar. 22, 2010, 14 pages [retrieved from: http://www.androidenea.com/2010/03/share-memory-using-ashmem-and-binder-in.html].

International Preliminary Report on Patentability for International Patent Application No. PCT/US2012/046802, mailed Jan. 23, 2014, 6 pages.

Notice of Allowance for U.S. Appl No. 13/484,951, mailed May 12, 2014 7 pages.

Official Action for U.S. Appl. No. 13/624,565, mailed Jun. 5, 2014 30 pages.

Official Action for U.S. Appl. No. 13/628,380, mailed Jun. 5, 2014 16 pages.

Official Action for U.S. Appl. No. 13/629,415, mailed Apr. 25, 2014 16 pages.

Official Action for U.S. Appl. No. 13/399,901, mailed May 1, 2014 17 pages.

Official Action for U.S. Appl. No. 13/399,936, mailed Feb. 20, 2014 27 pages.

Notice of Allowance for U.S. Appl. No. 12/905,920, mailed Feb. 27, 2014 13 pages.

Notice of Allowance for U.S. Appl. No. 12/948,686, mailed May 9, 2014 7 pages.

Official Action for U.S. Appl. No. 12/948,701, mailed Jun. 3, 2014 19 pages.

Official Action for U.S. Appl. No. 13/246,665, mailed Feb. 27, 2014 38 pages.

Official Action for U.S. Appl. No. 13/217,099, mailed May 29, 2014 73 pages.

Official Action for U.S. Appl. No. 13/217,108 mailed Feb. 25, 2014, 22 pages.

Official Action for U.S. Appl. No. 13/251,427, mailed May 23, 2014 15 pages.

Official Action for U.S. Appl. No. 13/217,130, mailed Mar. 20, 2014 18 pages.

Official Action for U.S. Appl. No. 13/247,170, mailed Jun. 5, 2014 58 pages.

Notice of Allowance for U.S. Appl. No. 13/246,669, mailed Apr. 11, 2014 11 pages.

Official Action for U.S. Appl. No. 13/246,671, mailed Jun. 5, 2014 60 pages.

(56) References Cited

OTHER PUBLICATIONS

Official Action for U.S. Appl. No. 13/246,675, mailed Mar. 7, 2014 34 pages.
"Apple iPod and iPhone dock Connector Pinout," AllPinouts, Sep. 27, 2010, 3 pages [www.allpinouts.org/index/php/Apple_iPod_iPad_and_iPhone_dock].
"Google Image Result Fujitsu Dual Screen Phone," ComputerRiver, Oct. 7, 2010, [retrieved Apr. 18, 2011], 1 page. Retrieved from: www.google.com/imgres?imgurl=http://www.computerriver.com/images/dual-screen-phone.jpg.
"Google Image Result for LG Dual Touch Screen Concept Phone by Eugene Kim," FGADGETS, Aug. 2010, [retrieved Apr. 18, 2011], 1 page. Retrieved from: www.google.com/imgres?imgurl=http://fgadgets.com/wp-content/uploads/2010/08/Ig-dual-touch-screen-phone-Eugene-Kim-01.jpg.
"Google Image Result for Fujitsu Dual Screen Phone," GSM DOME, Oct. 2010, [retrieved Apr. 18, 2011], 1 page. Retrieved from: www.google.com/imgres?imgurl=http://www.gsmdome.com/wp-content/uploads/2010/10/fujitsu-dual-screen-phone_w2cP7_54.jpg.
"Google Image Result for Kyocera Echo," Hardwaresphere, Feb. 2011, [retrieved Apr. 18, 2011], 1 page. Retrieved from: www.google.com/imgres?imgurl=http://www.hardwaresphere.com/wp-content/uploads/2011/02/kyocera-echo-dual-screen-android-phone-for-sprint-network.jpg.
"Google Image Result for HTC Triple Viper," SantaFeMods, Apr. 2010, [retrieved Apr. 18, 2011], 1 page. Retrieved from:www.google.com/imgres?imgurl=http://www.santafemods.com/Forum/AndroidForums/htcTripleViper.png.
"Google Image Result for Dual-Screen Phone," NetShet.org, Feb. 2011, [retrieved Apr. 18, 2011], 1 page. Retrieved from: www.google.com/imgres?imgurl=http://www.netshet.org/wp-content/uploads/2011/02/Dual-Scree. . . .
Google Transliteration IME website, 2010, available at www.google.com/ime/transliteration/help.html#features, 8 pages.
"How to Install Ubuntu on Your Nexus One/Android!" NexusOneHacks.net, Jul. 6, 2010, 9 pages [nexusonehacks.net/nexus-one-hacks/how-to-install-ubuntu-on-your-android].
InputKing Online Input System, 2011, available at www.inputking.com, 2 pages.
"Lapdock ™ for MOTOROLA ATRIX," at http://www.motorola.com/Consumers/US-EN/Consumer-Product-and-Services/Mobile . . . , accessed Apr. 18, 2011, 1 page.
"Motorola ATRIX 4G Laptop Dock Review," at http://www.phonearena.com/reviews/Motorola-ATRIX-4G-Laptop-Dock-Review_id2667, Mar. 2, 2011, 6 pages.
Burns, C., "Motorola ATRIX 4G Laptop Dock Review," at http://androidcommunity.com/motorola-atrix-4g-laptop-dock-review-20110220/, Feb. 20, 2011, 5 pages.
Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.
Dutko, "Domo Arigato Mr Androidato—An Introduction to the New Google Mobile Linux Framework, Android," Linux Journal, Mar. 2008, vol. 2008, Iss. 167, 9 pages.
Harman03, "Kyocera Echo Dual-screen Android Phone," posted 4 weeks from Apr. 18, 2011, 3 pages.
Kilpatrick et al., "Securing the X Window System with SELinux," NAI Labs Report No. 03-006, 2003, 33 pages.
Mikeclay, "Launch Multiple Programs at Once Using Simple Batch File," Feb. 5, 2009 available at www.web.archive.org/web/20090205134920/http://www.windowsreference.com/windows-2000/launch-multiple-programs-at-once-using-simple-batch-file/, 5 pages.
Sakhr Software—Arabic Optical Character Recognition, Jul. 15, 2011, available at www.sakhr.com/ocr.aspx, 1 page.
Stallman "GNU Operating System: Android and Users' Freedom," Sep. 2, 2013, 4 pages [gnu.org/philosophy/android-and-users-freedom.html].
Stein, S., "How does the Motorola Atrix 4G Lapdock compare with a laptop?" Crave—CNET, Feb. 9, 2011 [retrieved on Apr. 18, 2011], 7 pages. Retrieved from: www.news.cnet.com/8301- 17938—105-20031251-1. html.
Sud, et al., "Dynamic Migration of Computation Through Virtualization of the Mobile Platform," Mobile Networks and Applications, 2012, (published online Feb. 22, 2011), vol. 17, Iss. 2, pp. 206-215.
Website entitled, "Kyocera Echo," Kyocera Communications, Inc., 2011, [retrieved on Aug. 27, 2012], 6 pages. Retrieved from: www.echobykyocera.com/.
Website entitled, "Sony Tablet," Sony Corporation, 2012, [retrieved on Aug. 27, 2012], 3 pages. Retrieved from: www.store.sony.com/webapp/wcs/stores/servlet/CategoryDisplay?catalogId=10551&storeId=10151&langId=-1&categoryId=8198552921644795521.
Wikipedia, "Balloon help," Jul. 18, 2011, available at www.en.wikipedia.org/wiki/Balloon_help, 3 pages.
Wikipedia, "Google Pinyin," Aug. 27, 2011 available at www.en.wikipedia.org/wiki/Google_Pinyin, 3 pages.
Wikipedia, "Mouseover," Sep. 29, 2011, available at www.en.wikipedia.org/wiki/Mouseover, 2 pages.
Wikipedia, "Predictive text," Aug. 7, 2011, available at www.en.wikipedia.org/wiki/Predictive_test, 6 pages.
Wikipedia, "Sogou Pinyin," Jul. 23, 2011 available at www.en.wikipedia.org/wiki/Sogou_Pinyin, 3 pages.
Wikipedia, "Status bar," Sep. 8, 2011, available at www.en.wikipedia.org/wiki/Status_bar, 3 pages.
Wikipedia, "Tooltip," Sep. 17, 2011, available at www.en.wikipedia.org/wiki/Tooltip, 2 pages.
International Search Report for International (PCT) Patent Application No. PCT/US2012/046798, mailed Feb. 20, 2013 3 pages.
International Preliminary Report on Patentability for International (PCT) Patent Application No. PCT/US2012/046798, mailed Jan. 23, 2014 6 pages.
International Search Report and Written Opinion for International Patent Application No. PCT/US2012/046800, mailed Feb. 20, 2013, 9 pages.
International Preliminary Report on Patentability for International (PCT) Patent Application No. PCT/US2012/046800, mailed Jan. 23, 2014 6 pages.
International Search Report and Written Opinion for International Patent Application No. PCT/US2012/046802, mailed Feb. 20, 2013, 9 pages.
International Search Report for International Patent Application No. PCT/US2011/056149, mailed Apr. 24, 2012, 5 pages.
Written Opinion for International Patent Application No. PCT/US2011/056149, mailed Apr. 24, 2012, 4 pages.
International Preliminary Report on Patentability for International Patent Application No. PCT/US2011/056149, mailed Apr. 25, 2013, 6 pages.
International Search Report for International Patent Application No. PCT/US11/52822, mailed Apr. 27, 2012, 5 pages.
International Preliminary Report on Patentability for International (PCT) Patent Application No. PCT/US2011/052822, mailed Apr. 11, 2013 7 pages.
International Search Report for International Patent Application No. PCT/US11/52598, mailed Mar. 27, 2012, 3 pages.
International Preliminary Report on Patentability for International (PCT) Patent Application No. PCT/US2011/052598, mailed Apr. 11, 2013 9 pages.
International Search Report for International Patent Application No. PCT/US11/53835, mailed Apr. 30, 2012, 5 pages.
Written Opinion for International Patent Application No. PCT/US11/53835, mailed Apr. 30, 2012, 4 pages.
International Preliminary Report on Patentability for International (PCT) Patent Application No. PCT/US2011/053835, mailed Apr. 11, 2013 6 pages.
International Search Report for International Patent Application No. PCT/US2011/053130, mailed Apr. 24, 2012, 5 pages.
Written Opinion for International Patent Application No. PCT/US2011/053130, mailed Apr. 24, 2012, 4 pages.
International Preliminary Report on Patentability for International Patent Application No. PCT/US2011/053130, mailed Apr. 11, 2013, 6 pages.

(56) References Cited

OTHER PUBLICATIONS

International Search Report for International Patent Application No. PCT/US2011/053826, mailed Apr. 27, 2012, 5 pages.
Written Opinion for International Patent Application No. PCT/US2011/053826, mailed Apr. 27, 2012, 4 pages.
International Preliminary Report on Patentability for International Patent Application No. PCT/US2011/053826, mailed Apr. 11, 2013, 6 pages.
International Search Report for International Patent Application No. PCT/US2011/052988, mailed May 3, 2012, 5 pages.
Written Opinion for International Patent Application No. PCT/US2011/052988, mailed May 3, 2012, 4 pages.
International Preliminary Report on Patentability for International Patent Application No. PCT/US2011/052988, mailed Apr. 11, 2013, 6 pages.
Extended Search Report for European Patent Application No. 11829766.2, dated Jan. 8, 2014 11 pages.
International Search Report for International Patent Application No. PCT/US2011/054605, mailed Apr. 30, 2012, 5 pages.
Written Opinion for International Patent Application No. PCT/US2011/054605, mailed Apr. 30, 2012, 5 pages.
International Preliminary Report on Patentability for International Patent Application No. PCT/US2011/054605, mailed Apr. 11, 2013, 7 pages.
International Search Report for International Patent Application No. PCT/US2011/053909, mailed Apr. 30, 2012, 5 pages.
Written Opinion for International Patent Application No. PCT/US2011/053909, mailed Apr. 30, 2012, 4 pages.
International Preliminary Report on Patentability for International Patent Application No. PCT/US2011/053909, mailed Apr. 11, 2013, 6 pages.
International Search Report for International Patent Application No. PCT/US2011/054623, mailed Apr. 27, 2012, 5 pages.
Written Opinion for International Patent Application No. PCT/US2011/054623, mailed Apr. 27, 2012, 4 pages.
International Preliminary Report on Patentability for International Patent Application No. PCT/US2011/054623, mailed Apr. 11, 2013, 6 pages.
International Search Report for International Patent Application No. PCT/US2011/053037, mailed Mar. 20, 2012, 5 pages.
Written Opinion for International Patent Application No. PCT/US2011/053037, mailed Mar. 20, 2012, 6 pages.
International Preliminary Report on Patentability for International Patent Application No. PCT/US2011/053037, mailed Apr. 11, 2013, 8 pages.
International Search Report for International Patent Application No. PCT/US2011/053923, mailed Apr. 30, 2012, 5 pages.
Written Opinion for International Patent Application No. PCT/US2011/053923, mailed Apr. 30, 2012, 4 pages.
International Preliminary Report on Patentability for International Patent Application No. PCT/US2011/053923, mailed Apr. 11, 2013, 6 pages.
International Search Report for International Patent Application No. PCT/US2011/054017, mailed Apr. 24, 2012, 5 pages.
Written Opinion for International Patent Application No. PCT/US2011/054017, mailed Apr. 24, 2012, 4 pages.
International Preliminary Report on Patentability for International Patent Application No. PCT/US2011/054017, mailed Apr. 11, 2013, 6 pages.
International Search Report for International Patent Application No. PCT/US11/54105, mailed Apr. 30, 2012, 3 pages.
International Preliminary Report on Patentability for International (PCT) Patent Application No. PCT/US2011/054105, mailed Apr. 11, 2013 5 pages.
International Search Report for International Patent Application No. PCT/US11/53585, mailed May 4, 2012, 3 pages.
International Preliminary Report on Patentability for International (PCT) Patent Application No. PCT/US2011/053585, mailed Apr. 11, 2013 6 pages.
International Search Report for International Patent Application No. PCT/US2011/053665, mailed Apr. 30, 2012, 5 pages.
Written Opinion for International Patent Application No. PCT/US2011/053665, mailed Apr. 30, 2012, 4 pages.
International Preliminary Report on Patentability for International Patent Application No. PCT/US2011/053665, mailed Apr. 11, 2013, 6 pages.
International Search Report for International Patent Application No. PCT/US2011/053691, mailed May 4, 2012, 5 pages.
Written Opinion for International Patent Application No. PCT/US2011/053691, mailed May 4, 2012, 4 pages.
International Preliminary Report on Patentability for International Patent Application No. PCT/US2011/053691, mailed Apr. 11, 2013, 6 pages.
International Search Report for International Patent Application No. PCT/US2011/054019, mailed Apr. 10, 2012, 5 pages.
Written Opinion for International Patent Application No. PCT/US2011/054019, mailed Apr. 10, 2012, 4 pages.
International Preliminary Report on Patentability for International Patent Application No. PCT/US2011/054019, mailed Apr. 11, 2013, 6 pages.
International Search Report for International Patent Application No. PCT/US2011/053127, mailed Apr. 24, 2012, 5 pages.
Written Opinion for International Patent Application No. PCT/US2011/053127, mailed Apr. 24, 2012, 4 pages.
International Preliminary Report on Patentability for International Patent Application No. PCT/US2011/053127, mailed Apr. 11, 2013, 6 pages.
Official Action for U.S. Appl. No. 13/247,719, mailed Mar. 29, 2013 16 pages.
Official Action for U.S. Appl. No. 13/247,719, mailed Aug. 16, 2013 20 pages.
Official Action for U.S. Appl. No. 13/484,951, mailed Aug. 17, 2012, 13 pages.
Official Action for U.S. Appl. No. 13/484,951, mailed Mar. 11, 2013 11 pages.
Official Action for U.S. Appl. No. 13/484,951, mailed Jul. 25, 2013 12 pages.
Official Action for U.S. Appl. No. 13/484,951, mailed Jan. 30, 2014 12 pages.
Official Action for U.S. Appl. No. 13/399,901, mailed Aug. 2, 2013 17 pages.
Final Action for U.S. Appl. No. 13/399,901, mailed Dec. 26, 2013 20 pages.
Official Action for U.S. Appl. No. 13/399,929, mailed Dec. 3, 2013 21 pages.
Official Action for U.S. Appl. No. 13/399,936, mailed Sep. 10, 2013 23 pages.
Official Action for U.S. Appl. No. 12/905,920 mailed Dec. 7, 2012, 13 pages.
Official Action for U.S. Appl. No. 12/905,920 mailed Mar. 15, 2012, 12 pages.
Official Action for U.S. Appl. No. 12/905,920 mailed Jul. 3, 2012, 14 pages.
Official Action for U.S. Appl. No. 12/905,920 mailed Apr. 25, 2013, 16 pages.
Official Action for U.S. Appl. No. 12/905,920, mailed Sep. 30, 2013 20 pages.
Official Action for U.S. Appl. No. 12/948,686, mailed Jul. 26, 2013 11 pages.
Official Action for U.S. Appl. No. 12/948,686, mailed Jan. 29, 2014 13 pages.
Official Action for U.S. Appl. No. 12/948,701, mailed Nov. 16, 2012, 16 pages.
Official Action for U.S. Appl. No. 12/948,701, mailed Jun. 7, 2013 16 pages.
Official Action for U.S. Appl. No. 13/246,665, mailed Apr. 24, 2013 30 pages.
Official Action for U.S. Patent No. 246,665, mailed Aug. 28, 2013 33 pages.
Official Action for U.S. Appl. No. 13/217,099 mailed Apr. 10, 2013, 53 pages.

(56) References Cited

OTHER PUBLICATIONS

Final Action for U.S. Appl. No. 13/217,099, mailed Oct. 9, 2013 74 pages.
Official Action for U.S. Appl. No. 13/247,885 mailed Mar. 19, 2013, 19 pages.
Notice of Allowance for U.S. Appl. No. 13/247,885, mailed Aug. 29, 2013 12 pages.
Notice of Allowance for U.S. Appl. No. 13/247,885, mailed Jan. 9, 2014 8 pages.
Official Action for U.S. Appl. No. 13/217,108, mailed Oct. 11, 2013 13 pages.
Official Action for U.S. Appl. No. 13/251,427 mailed Feb. 15, 2013, 18 pages.
Final Action for U.S. Appl. No. 13/251,427, mailed Oct. 21, 2013 17 pages.
Official Action for U.S. Appl. No. 13/247,166 mailed Mar. 21, 2013, 4 pages Restriction Requirement.
Official Action for U.S. Appl. No. 13/247,166, mailed Jul. 2, 2013 12 pages.
Notice of Allowance for U.S. Appl. No. 13/247,166, mailed Nov. 4, 2013 14 pages.
Official Action for U.S. Appl. No. 13/250,764, mailed Dec. 11, 2013 23 pages.
Official Action for U.S. Appl. No. 13/217,130 mailed Mar. 15, 2013 12 pages.
Official Action for U.S. Appl. No. 13/217,130, mailed Sep. 16, 2013 12 pages.
Official Action for U.S. Appl. No. 13/247,170 mailed Apr. 11, 2013, 36 pages.
Official Action for U.S. Appl. No. 13/247,170, mailed Aug. 5, 2013 34 pages.
Official Action for U.S. Appl. No. 13/247,170, mailed Dec. 11, 2013 47 pages.
Official Action for U.S. Appl. No. 13/246,669 mailed Jan. 8, 2013, 14 pages.
Official Action for U.S. Appl. No. 13/246,699, mailed Jul. 12, 2013 18 pages.
Notice of Allowance for U.S. Appl. No. 13/246,669, mailed Sep. 11, 2013 16 pages.
Official Action for U.S. Appl. No. 13/246,671, mailed Mar. 27, 2013 34 pages.
Official Action for U.S. Appl. No. 13/246,671, mailed Jul. 15, 2013.
Official Action for U.S. Appl. No. 13/246,671, mailed Nov. 20, 2013 50 pages.
Official Action for U.S. Appl. No. 13/246,128 mailed May 10, 2013, 40 pages.
Official Action for U.S. Appl. No. 13/246,128, mailed Aug. 23, 2013 46 pages.
Official Action for U.S. Appl. No. 13/246,128, mailed Dec. 26, 2013 43 pages.
Official Action for U.S. Appl. No. 13/246,133 mailed Apr. 16, 2013, 25 pages.
Official Action for U.S. Appl. No. 13/246,133, mailed Aug. 23, 2013 32 pages.
Official Action for U.S. Appl. No. 13/246,133, mailed Jan. 15, 2014 37 pages.
Official Action for U.S. Appl. No 13/246,675 mailed May 1, 2013, 27 pages.
Official Action for U.S. Appl. No. 13/246,675, mailed Sep. 27, 2013 32 pages.
Official Action for U.S. Appl. No. 13/217,121 mailed Mar. 6, 2013, 11 pages.
Official Action for U.S. Appl. No. 13/217,121, mailed Aug. 1, 2013 11 pages.
Official Action for U.S. Appl. No. 13/217,121, mailed Feb. 10, 2014 12 pages.
Official Action for Mexican Patent Application No. MX/a/2013/003515, mailed Jun. 12, 2014, 3 pages (includes English summary).
Official Action for European Patent Application No. 11829880.1, mailed Aug. 13, 2014, 5 pages.
Official Action for U.S. Appl. No. 13/247,719, mailed Aug. 29, 2014 21 pages.
Official Action for U.S. Appl. No. 13/624,565, mailed Oct. 14, 2014 36 pages.
Official Action for U.S. Appl. No. 13/628,380, mailed Sep. 12, 2014 16 pages.
Official Action for U.S. Appl. No. 13/628,157, mailed Aug. 14, 2014 7 pages.
Official Action for U.S. Appl. No. 13/628,234, mailed Sep. 12, 2014 9 pages.
Official Action for U.S. Appl. No. 13/628,949, mailed Oct. 9, 2014 11 pages.
Official Action for U.S. Appl. No. 13/399,929, mailed Jun. 18, 2014 35 pages.
Notice of Allowance for U.S. Appl. No. 13/399,936, mailed Sep. 15, 2014 11 pages.
Official Action for U.S. Appl. No. 13/246,665, mailed Jun. 12, 2014 39 pages.
Official Action for U.S. Appl. No. 13/217,108, mailed Jun. 20, 2014 18 pages.
Notice of Allowance for U.S. Appl. No. 13/217,108, mailed Jul. 11, 2014 7 pages.
Official Action for U.S. Appl. No. 13/250,764, mailed Jul. 1, 2014 26 pages.
Official Action for U.S. Appl. No. 13/217,130, mailed Aug. 5, 2014 19 pages.
Notice of Allowance for U.S. Appl. No. 13/247,170, mailed Sep. 23, 2014 11 pages.
Notice of Allowance for U.S. Appl. No. 13/246,671, mailed Sep. 25, 2014 9 pages.
Official Action for U.S. Appl. No. 13/246,118, mailed Oct. 8, 2014 10 pages.
Official Action for U.S. Appl. No. 13/246,128, mailed Jun. 13, 2014 50 pages.
Official Action for U.S. Appl. No. 13/246,133, mailed Jun. 13, 2014 44 pages.
Notice of Allowance for U.S. Appl. No. 13/246,675, mailed Jul. 29, 2014 9 pages.
Official Action for U.S. Appl. No. 13/217,121, mailed Jun. 12, 2014 13 pages.
Official Action for U.S. Appl. No. 13/399,901, mailed Oct. 29, 2014 23 pages.
Notice of Allowance for Mexican Patent Application No. MX/a/2013/003515, mailed Nov. 5, 2014, 1 page.
European Extended Search Report for European Patent Application No. 11829880.1, mailed Dec. 5, 2014, 10 pages.
Notice of Allowance for Mexican Patent Application No. MX/a/2013/003427, mailed Nov. 26, 2014, 1 page.
Notice of Allowance for U.S. Appl. No. 14/498,330, mailed Oct. 27, 2014 8 pages.
Official Action for U.S. Appl. No. 13/624,565, mailed Jan. 8, 2015 47 pages.
Official Action for U.S. Appl. No. 13/628,380, mailed Jan. 2, 2015 18 pages.
Official Action for U.S. Appl. No. 13/628,170, mailed Nov. 3, 2014 9 pages.
Official Action for U.S. Appl. No. 13/629,415, mailed Dec. 3, 2014 22 pages.
Official Action for U.S. Appl. No. 12/948,701, mailed Dec. 15, 2014 19 pages.
Notice of Allowance for U.S. Appl. No. 13/246,665, mailed Jan. 13, 2015 9 pages.
Official Action for U.S. Appl. No. 13/217,099, mailed Dec. 1, 2014 82 pages.
Official Action for U.S. Appl. No. 13/251,427, mailed Dec. 8, 2014 17 pages.
Notice of Allowance for U.S. Appl. No. 13/250,764, mailed Dec. 4, 2014 8 pages.
Notice of Allowance for U.S. Appl. No. 13/217,130, mailed Dec. 3, 2014 5 pages.
Notice of Allowance for U.S. Appl. No. 13/246,133, mailed Jan. 21, 2015 10 pages.

(56) References Cited

OTHER PUBLICATIONS

Official Action for U.S. Appl. No. 13/217,121, mailed Dec. 18, 2014 15 pages.
Extended Search Report for European Patent Application No. 11829853.8, dated Jan. 29, 2015 10 pages.
Official Action for U.S. Appl. No. 13/247,719, mailed Mar. 12, 2015 19 pages.
Notice of Allowance for U.S. Appl. No. 13/628,157, mailed Apr. 1, 2015 10 pages.
Official Action for U.S. Appl. No. 13/629,415, mailed Mar. 27, 2015 21 pages.
Official Action for U.S. Appl. No. 13/399,929, mailed Mar. 23, 2015 34 pages.
Notice of Allowance for U.S. Appl. No. 13/217,099, mailed Mar. 23, 2015 14 pages.
Notice of Allowance for U.S. Appl. No. 13/246,118, mailed Feb. 18, 2015 7 pages.
Notice of Allowance for U.S. Appl. No. 13/246,128, mailed Jan. 29, 2015 10 pages.

* cited by examiner

CROSS-ENVIRONMENT COMMUNICATION USING APPLICATION SPACE API

This Application is a continuation of and claims the benefit of the filing date of U.S. patent application Ser. No. 13/247,885, filed Sep. 28, 2011, entitled "Cross-Environment Communication Using Application Space API," now U.S. Pat. No. 8,726,294, which is a continuation-in-part and claims the benefit of the filing date of U.S. patent application Ser. No. 13/217,099, filed Aug. 24, 2011, entitled "Cross-Environment Communication Framework," which claims the benefit of U.S. Provisional Application Nos. 61/389,117, filed Oct. 1, 2010, entitled "Multi-Operating System Portable Docking Device"; 61/507,199, filed Jul. 13, 2011, entitled "Dockable Mobile Software Architecture"; 61/507,201, filed Jul. 13, 2011, entitled "Cross-Environment Communication Framework"; 61/507,203, filed Jul. 13, 2011, entitled "Multi-Operating System"; 61/507,206, filed Jul. 13, 2011, entitled "Auto-Configuration of a Docked System in a Multi-OS Environment"; and 61/507,209, filed Jul. 13, 2011, entitled "Auto-Waking of a Suspended Secondary OS in a Dockable System," wherein the entire contents of all of the foregoing priority applications are herein incorporated by reference for all purposes.

BACKGROUND

1. Field

This Application relates generally to the field of mobile computing environments, and more particularly to supporting multiple user environments through the use of multiple operating systems in a single mobile computing device.

2. Relevant Background

Mobile computing devices are becoming ubiquitous in today's society. For example, as of the end of 2008, 90 percent of Americans had a mobile wireless device. At the same time, the capabilities of mobile devices are advancing rapidly, including smartphones that integrate advanced computing capabilities with mobile telephony capabilities. Mobile providers have launched hundreds of new smartphones in the last three years based upon several different platforms (e.g., Apple iPhone, Android, BlackBerry, Palm, and Windows Mobile). In the U.S., smartphone penetration reached almost 23% by the middle of 2010, and over 35% in some age-groups. In Europe, the smartphone market grew by 41% from 2009 to 2010, with over 60 million smartphone subscribers as of July 2010 in the five largest European countries alone.

While smartphones are gaining in popularity and computing capability, they provide a limited user experience. Specifically, they typically have an operating system that is modified for mobile device hardware and a restricted set of applications that are available for the modified operating system. For example, many smartphones run Google's Android operating system. Android runs only applications that are specifically developed to run within a Java-based virtual machine runtime environment. In addition, while Android is based on a modified Linux kernel, it uses different standard C libraries, system managers, and services than Linux. Accordingly, applications written for Linux do not run on Android without modification or porting. Similarly, Apple's iPhone uses the iOS mobile operating system. Again, while iOS is derived from Mac OS X, applications developed for OS X do not run on iOS. Therefore, while many applications are available for mobile operating systems such as Android and iOS, many other common applications for desktop operating systems such as Linux and Mac OS X are not available on the mobile platforms.

Accordingly, smartphones are typically suited for a limited set of user experiences and provide applications designed primarily for the mobile environment. In particular, smartphones do not provide a suitable desktop user experience, nor do they run most common desktop applications. As a result, many users carry and use multiple computing devices including a smartphone, laptop, and/or tablet computer. In this instance, each device has its own CPU, memory, file storage, and operating system.

Connectivity and file sharing between smartphones and other computing devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

SUMMARY

Embodiments of the present invention are directed to providing the mobile computing experience of a smartphone and the appropriate user experience of a secondary terminal environment in a single mobile computing device. A secondary terminal environment may be some combination of visual rendering devices (e.g., monitor or display), input devices (e.g., mouse, touch pad, touch-screen, keyboard, etc.), and other computing peripherals (e.g., HDD, optical disc drive, memory stick, camera, printer, etc.) connected to the computing device by a wired (e.g., USB, Firewire, Thunderbolt, etc.) or wireless (e.g., Bluetooth, WiFi, etc.) connection. In embodiments, a mobile operating system associated with the user experience of the mobile environment and a desktop operating system associated with the user experience of the secondary terminal environment are run concurrently and independently on a shared kernel.

According to one aspect consistent with various embodiments, a method comprises receiving, in a first operating system, a first remote method call of a first inter-process communication type directed to a first application running within the first operating system through a first inter-process communication channel from a second application, the second application running within a second operating system, the first and second operating systems running concurrently on a shared kernel, the first remote method call including a first data parcel, translating, in the first operating system, the first remote method call into a second remote method call of a second inter-process communication type, the second remote method call including a second data parcel, and sending, by the first operating system, the second remote method call through a second inter-process communication channel to the first application.

According to other aspects consistent with various embodiments, the translating in the first operating system may include unparceling the first data parcel and reparceling data into the second data parcel included in the second remote method call. The first remote method call may be a synchronous remote method call while the second remote method call may be an asynchronous remote method call. The first remote method call may be performed using a unix socket and the second remote method call may be performed using the Binder IPC mechanism. The first application may be registered in the first operating system to receive calls to the second remote method. Translating the remote method calls may be performed in a service of the first operating system.

According to other aspects consistent with various embodiments, a method comprises instantiating, by a first application running within a first operating system, a method of an application programming interface of the first operating system, the method implementing a sink for a predetermined remote communication request, requesting, by the method of the application programming interface, an extended inter-process communication interface, instantiating, by the first operating system, the extended inter-process communication interface, registering, by the first operating system, the extended inter-process communication interface to receive the predetermined remote communication requests directed to the first application, receiving, by the first operating system, a request to instantiate a proxy for the predetermined remote communication request within a second application running within a second operating system, the first and second operating systems running concurrently on a shared kernel, and passing, by the first operating system, a reference to the extended inter-process communication interface to the second application.

According to other aspects consistent with various embodiments, the predetermined remote communication request may be specific to a category of applications that includes the first and second applications. The sink may obtain a connected endpoint of an inter-process communication interface instantiated by a remote communication service of the first operating system.

According to other aspects consistent with various embodiments, the method may include receiving, by the first operating system, a request to instantiate a second proxy for the predetermined remote communication request within a third application, and passing, by the first operating system, the reference to the extended inter-process communication interface to the third application. Registering of the extended inter-process communication interface by the first operating system may include associating the inter-process communication with a name key of the application.

According to other aspects consistent with various embodiments, a mobile computing device includes a first application running within a first operating system, the first application instantiating a sink for a predetermined remote communication request, a second application running within a second operating system, the second operating system running concurrently with the first operating system on a shared kernel, the second application instantiating a proxy for the predetermined remote communication request, and a remote communication service of the first operating system, the remote communication service establishing a connection between the proxy and the sink through an extended inter-process communication interface.

According to other aspects consistent with various embodiments, the sink may include a method of an application programming interface of the first operating system. The application programming interface may be provided within an application space of the first operating system. The application programming interface may include classes of sinks, the classes of sinks associated with categories of applications. The application programming interface may include a java archive file. The method of the application programming interface may request the extended inter-process communication interface from the remote communication service. The remote communication service may register the sink to receive inter-process communication through the extended inter-process communication interface. Upon registration by the remote communication service, the extended inter-process communication interface may be pushed by the remote communication service. The first operating system may be an Android mobile operating system while the second operating system may be a Linux operating system.

BRIEF DESCRIPTION OF THE DRAWINGS

Embodiments of the present invention are illustrated in referenced figures of the drawings, in which like numbers refer to like elements throughout the description of the figures.

DETAILED DESCRIPTION

Figure 1:
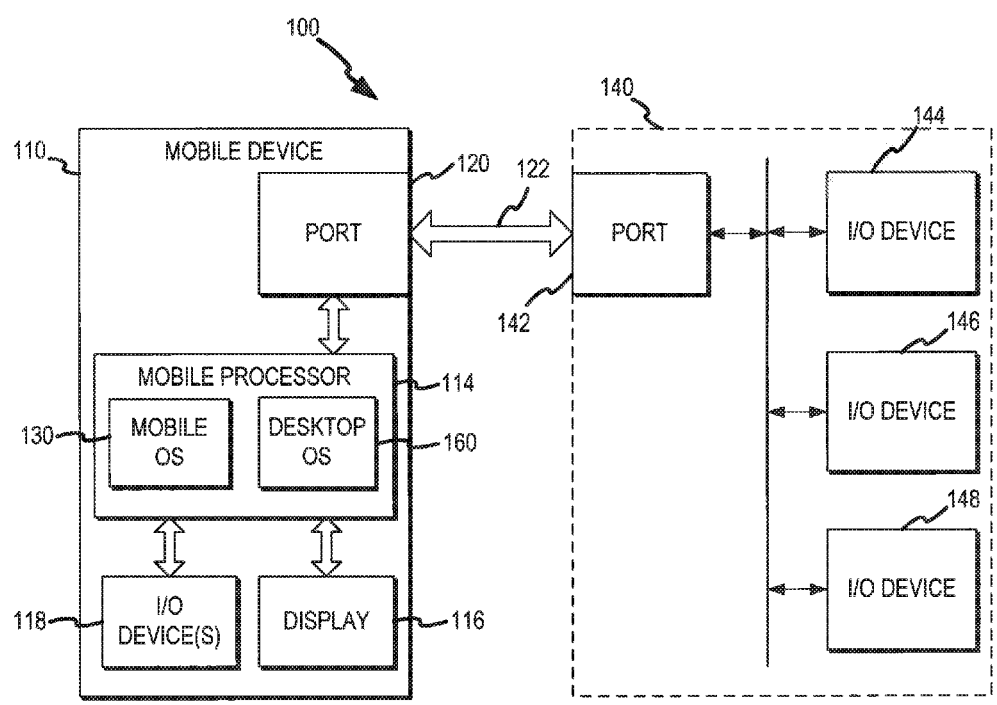
FIG. 1 illustrates a computing environment that provides multiple user computing experiences, according to various embodiments.

Traditionally, handheld mobile telephony devices (i.e., "handsets") were developed independently and served a separate and distinct purpose from that of personal computers ("PCs") such as desktops and laptops. Handheld mobile telephony devices were focused primarily on communication while PCs were focused on computing tasks such as creating and editing documents, text-based communication (e.g., email, etc.), multimedia, and web browsing. However, mobile telephony devices are including ever-increasing computing ability and users increasingly desire convergence of communication and computing capabilities into multi-use mobile devices.

For example, mobile telephony devices called "smartphones" that include computing capabilities are increasing in popularity. Many of these smartphones include a mobile operating system ("OS") running on a mobile processor. While mobile processors and mobile OSs have increased the capabilities of these devices, smartphones have not tended to replace PC environments such as desktop or notebook computers at least because of the limited user experience provided. In particular, for some tasks such as typing or editing documents, a full-size keyboard and large display are easier to use than the user interface components typically found on a smartphone. For example, smartphones typically use a small thumb-style QWERTY keyboard, touch-screen display, click-wheel, and/or scroll-wheel as user interface components. Selecting menu options or items typically involves either using a touch-screen display, or using the click-wheel or scroll-wheel to navigate menus and select items. This interface is suited to the small display screens and limited menu options typically found in smartphones, but not suited to controlling more traditional programs with a larger number of menu options, larger screen area, and user interface built around a pointing device such as a traditional mouse.

Embodiments of the invention are directed to an innovative cross-environment communications framework ("CECF") that allows for fast communications between applications and services of multiple operating systems running independently and concurrently on the same shared kernel. For example, embodiments allow fast communication between applications and services of an Android mobile OS running on a shared kernel and applications and services of a Linux desktop OS running on the same shared kernel.

Embodiments include an extension to the Android "Binder" inter-process communication ("IPC") mechanism that allows for app-to-app communications within the Android OS. For example, Android OS applications within can register with the remote communication service to be able to communicate (e.g., synchronize data, settings, etc.) in a synchronous and/or asynchronous way. Other embodiments include base classes of the Binder mechanism for a Linux desktop OS that allow communication between applications of the Linux desktop OS and Android OS applications and services. For example, Android applications running on the Android OS can share data, settings, and preferences with Linux applications running on the Linux desktop OS.

Further embodiments support inter-process communication between OSs that use incompatible IPC mechanisms. For example, a first OS may use a first IPC mechanism for communication across process boundaries. On a second OS running concurrently with the first OS on a shared kernel, applications may use a second IPC mechanism for communication across process boundaries for processes running in the second OS.

Yet further embodiments are directed to simplifying app-to-app sharing of data, content, and settings through the use of an application programming interface ("API") layer that provides application category-specific functions and methods for requesting and providing information between applications. Notably, the applications may be in active concurrent execution within a first OS, or running on independent OSs running on the same shared kernel.

FIG. 1 illustrates a computing environment 100 that provides multiple user computing experiences, according to various embodiments. Computing environment 100 includes mobile computing device 110. Mobile computing device 110 includes mobile computing hardware and software components. Hardware components of mobile computing device 110 include mobile processor 114, display 116, I/O device(s) 118, and/or port 120. Software components of mobile computing device 110 include a first OS 130 and a second OS 160. In one embodiment, first OS 130 is a mobile OS and second OS 160 is a desktop OS. When mobile computing device 110 is operated as a stand-alone mobile device, mobile OS 130 presents a typical mobile computing user experience through display 116 and I/O device(s) 118. The mobile computing experience provided by mobile OS 130 typically includes mobile telephony capabilities and a graphical user interface ("GUI") suited to the mobile environment including display 116 and I/O device(s) 118. For example, display 116 may be a touch-screen display and application programs (i.e., "Apps") running on mobile OS 130 may be controlled through the GUI of mobile OS 130 on touch-screen display 116.

Mobile computing device 110 may be connected to I/O devices 144, 146 and/or 148 through port 120. I/O devices 144, 146, and/or 148 may make up a secondary terminal environment 140. In some instances, secondary terminal environment 140 may be more suited to desktop OS 160 than mobile OS 130. For example, secondary terminal environment 140 may include a keyboard 144, pointing device 146, and a display device 148. In these instances, desktop OS 160 can be associated with secondary terminal environment 140 to provide the full capabilities of a notebook or desktop computer environment through secondary terminal environment 140. In other instances, secondary terminal environment 140 may be more suited for mobile OS 130 than desktop OS 160. For example, secondary terminal environment 140 may include a touch-screen display. In these instances, mobile OS 130 may be associated with secondary terminal environment 140.

In FIG. 1, port 120 is shown as connected to port 142 of secondary terminal environment 140 through interface 120. However, port 120 may include separate connections to each I/O device 144, 146 and 148 through interface 122. Interface 122 may be any suitable wired or wireless interface or combination of wired and wireless interfaces for connecting devices such as keyboards, monitors, pointing devices, etc. For example, interface 122 may be a combination of a display interface (e.g., VGA, DVI, HDMI, etc.) and a device communications interface (e.g., USB, Bluetooth, Firewire, other serial communications interface, etc.). Alternatively, interface 122 may be a single communications interface that supports both video and device communications signals (e.g., Thunderbolt, etc.).

Traditionally, the hardware and software development paths for the handset environment and the PC environment have been completely independent because of different use models and competing constraints on product design. PCs, including desktop and laptop computers, are designed to be flexible and powerful. Specifically, PC hardware architecture is typically based around a general purpose PC processor connected to memory, graphics, and external components through various general purpose interfaces on a motherboard. For example, a personal computer motherboard may include a processor connected through a logic chipset to a graphics processor, system memory (e.g., RAM), and various other components through communication interfaces (PCI, USB, ISA, IDE, etc.). Some more highly integrated PC processors include an interface to a graphics processor (e.g., AGP, etc.) and/or interface to system memory (e.g., SDR, DDR, DDR2, DDR3, DRDRAM, etc.) on the processor.

PC processors are optimized for high processor clock speed and computationally intensive tasks. The personal computer market is presently dominated by processors based on the x86 CPU architecture. Current x86-based PC processors for desktop computers have multiple 64-bit central processing units ('CPUs') (or "cores") with clock speeds exceeding 2.5 GHz and power consumption approaching 100 Watts. Current x86-based PC processors for laptop computers typically run at clock speeds up to 2.0 GHz and have power consumption in the range of 15-45 Watts. Because of the large power consumption of these processors, desktop and laptop computers may require cooling devices such as fans or heatsinks to remove waste heat from the processor. In addition, the battery life of laptop computers using x86-based PC processors is typically less than four hours.

In contrast, mobile processors for handsets are optimized for low power consumption and a high level of integration to reduce the overall size of the handset. For example, mobile processors for handsets such as smartphones typically run at clock speeds lower than 2.0 GHz, have power consumption of less than 1 Watt, and integrate functions common to the mobile environment such as graphics controllers, communications interfaces, and camera controllers. The most common mobile processor architectures are reduced instruction set computing ("RISC") processor architectures. Specifically, the "ARM" mobile processor architecture is currently the predominant architecture for mobile processors designed for smartphones and other ultra-portable and low power computing devices. Some PC processor manufacturers also refer to PC processors designed for use in laptop computers as "mobile processors." However, as used herein, the term "mobile processor" refers to a processor suited for use in a handset or smartphone, typically consuming less than 1 Watt and integrating mobile functionality.

Personal computers and handsets also typically have different system resources, input/output ("I/O") devices, and peripherals. For example, desktop and laptop computers typically have much larger amounts of system memory and storage capacity than handsets. While a typical laptop computer may have more than 2 GB of RAM and a hard-drive with a capacity of more than 250 GB, handsets typically have less than 512 MB of RAM and a solid-state drive with a capacity of less than 32 GB. User interface components of personal computers typically include a display screen larger than 9 inches diagonally, a full keyboard, and pointing device(s) for user input. In contrast, handsets typically include a display screen smaller than 7 inches diagonally and user interface components such as a thumb-style QWERTY keyboard, touch-screen display, click-wheel, and/or scroll-wheel. Peripherals found on personal computers typically include an optical disk drive (e.g., CD, DVD, DVD-RW, etc.), expansion ports (e.g., PCMCIA, SCSI, Express Card, etc.), video output port (e.g., VGA, DVI, HDMI, etc.), and generic device ports (e.g., USB, etc.). In contrast, handsets typically do not have optical disk drives or expansion ports. However, other devices are typically integrated into handsets including wireless communications interface(s) (e.g., GSM, CDMA, LTE, EDGE, WiFi, WiMax, etc.), GPS chipset, accelerometer, camera(s), and/or solid-state memory port (SD, Memory Stick, etc.).

Software for personal computers and handsets has also traditionally been developed independently. For example, personal computers including desktops and laptops typically run different operating systems than mobile devices. An operating system is software that manages computer hardware and resources and provides common services for execution of applications software on the computer hardware. Operating systems are generally described as having various abstraction layers, where each layer interfaces with the layer below through an interface.

Generally, the kernel of an operating system refers to the core OS layer that manages the computing devices resources such as the CPU(s) (CPU scheduling), memory, and I/O (including peripheral and file system access). A kernel will usually provide features for low-level scheduling of processes (dispatching), inter-process communication, process synchronization, context switching, manipulation of process control blocks, interrupt handling, process creation and destruction, and process suspension and resumption. The OS kernel may or may not include device drivers. Other layers of the OS interface with the kernel through system calls or an application programming interface ("API") layer.

Generally, other OS layers include the libraries layer, application framework layer, and application layer. The libraries layer typically includes system libraries and other user libraries. The application framework layer includes services, managers, and runtime environments. The application layer includes user applications, which may run within a runtime environment of the application framework layer. A user interacts with the OS through the OS GUI. The GUI presents menus, buttons, and controls that the user selects to control and use applications running on the OS. Commonly, the term "desktop environment" is used to refer to a style of GUI through which the user interfaces with the OS using icons, windows, toolbars, folders, and/or desktop widgets, and is not limited to a desktop OS. For example, a mobile OS could have a desktop environment, referring to the look and feel of the mobile OS GUI.

Operating systems for personal computers (desktop OSs) were designed for multi-tasking, larger screen areas, and to provide a flexible environment for application developers. As used herein, the term desktop OS refers to an operating system designed for use with a personal computer environment, for example a desktop or laptop use environment. Examples of desktop OSs include various distributions of Linux, Mac OS X, and Windows 7, among many others.

Operating systems for mobile devices (mobile OSs) were developed for the smaller screen area, lower processing power, smaller memory, and smaller disk space typically found on handsets and smartphones. Example mobile OSs include Android, Apple's iOS (for the iPhone and iPad), Microsoft's Windows Mobile (superseded by Windows Phone 7), Nokia's Symbian, and Palm's Palm OS (superseded by HP webOS). As used herein, the term mobile OS refers to an operating system designed for use with a mobile environment including running on a low-power processor with reduced system resources compared to the PC environment (i.e., desktop or laptop computer system).

Mobile operating systems generally have a particular application development environment that is used to create application programs (i.e., "apps") that run on the mobile OS. The application development environment both facilitates application development by providing common tools and APIs for accessing system resources and services, and limits what applications are allowed to do such that the mobile device is able to continue to provide other required functions. For example, incoming phone calls and texts may interrupt a running application to notify the user of the incoming call or text.

The most widely adopted mobile OS is Google's Android. While Android is based on Linux, it includes modifications to the kernel and other OS layers for the mobile environment and mobile processors. In particular, while the Linux kernel is designed for the x86 CPU architecture, the Android kernel is modified for ARM-based mobile processors. Android device drivers are also particularly tailored for devices typically present in a mobile hardware architecture including touchscreens, mobile connectivity (GSM/EDGE, CDMA, Wi-Fi, etc.), battery management, GPS, accelerometers, and camera modules, among other devices.

In Android, applications run within the Dalvik virtual machine on an object-oriented application framework designed specifically for the memory and processor speed constraints of mobile hardware architectures. Applications are developed for the Dalvik virtual machine through the Android SDK. In addition, Android does not have a native X Window System nor does it support the full set of standard GNU libraries, and this makes it difficult to port existing GNU/Linux applications or libraries to Android.

Apple's iOS operating system (run on the iPhone) and Microsoft's Windows Phone 7 are similarly modified for the mobile environment and mobile hardware architecture. For example, while iOS is derived from the Mac OS X desktop OS, common Mac OS X applications do not run natively on iOS. Specifically, applications are developed for iOS through an SDK to run within the "Cocoa Touch" runtime environment of iOS, which provides basic application infrastructure and support for key iOS features such as touch-based input, push notifications, and system services. Therefore, applications written for Mac OS X do not run on iOS without porting them through the iOS SDK. In addition, it may be difficult to port Mac OS X applications to iOS because of differences between user libraries and application framework layers of the two OSs, and differences in system resources of the mobile and desktop hardware.

Because of the differences in processing requirements, system resources, and application development, applications developed for desktop OSs typically do not run on mobile OSs. Additionally, desktop applications may not be easily ported to mobile OSs because they are optimized for a larger screen area, more processing speed, more system memory, different libraries, and commonly a different GUI. As a result, users typically use separate computing devices for each user environment, including a smartphone, tablet computer, laptop computer, and/or desktop computer. In this instance, each device has its own CPU, memory, file storage, and OS.

Connectivity and file sharing between smartphones and other devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

Recently, some attempts have been made to provide a more complete user experience with a single mobile computing device. For example, a smartphone may be connected to an external monitor and input devices such as a full keyboard to provide a more desktop-like user experience, with the mobile OS graphical user interface extended to the larger screen and accepting input from the input devices. However, because the external monitor and input devices are only an extension of the smartphone's operating system and user interface, the capabilities of the docked environment are limited by the smartphone's mobile OS. For example, many software applications available on desktop OSs are not available or have limited functionality on mobile OSs. Accordingly, these devices do not present a full desktop user experience when connected to an external environment.

Referring still to FIG. 1, computing environment 100 provides multiple user computing experiences without the above limitations. Specifically, because mobile computing device 110 includes multiple OSs, where each OS is suited to a particular computing environment, mobile computing device 110 may be adapted with external devices to provide a broad range of user experiences with a single mobile computing device. For example, a user may have a mobile computing device 110 and a secondary terminal environment 140 that provides the user experience of a laptop when connected to mobile computing device 110. In this instance, desktop OS 160 of the mobile computing device is associated with the secondary terminal environment 140 when the secondary terminal environment is connected to mobile computing device 110. To the user, the full capabilities of desktop OS 160 are available through secondary terminal environment 140.

Figure 2:
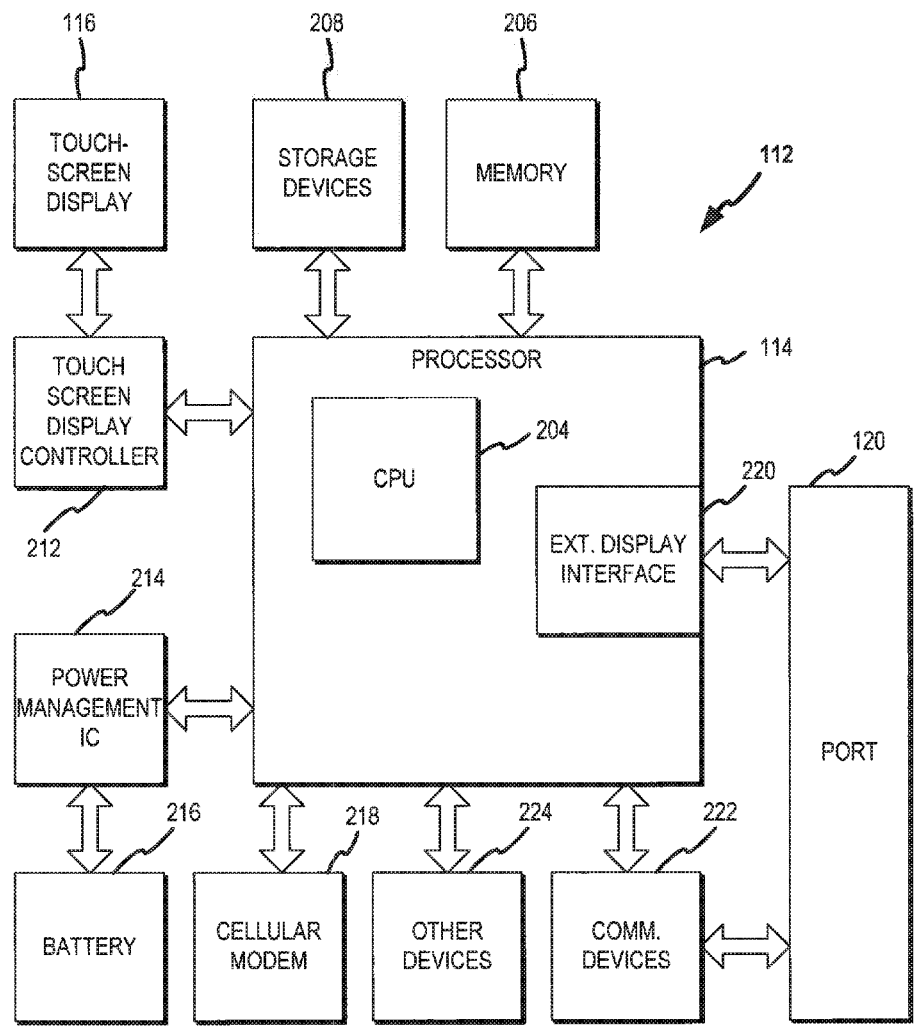
FIG. 2 illustrates an exemplary system architecture for a mobile computing device, according to various embodiments.

FIG. 2 illustrates an exemplary hardware system architecture for mobile computing device 110, according to various embodiments. Mobile computing device hardware 112 includes mobile processor 114 that includes one or more CPU cores 204 and external display interface 220. Generally, mobile computing device hardware 112 also includes I/O device(s) 118, memory 206, storage device(s) 208, touch-screen display controller 210 connected to touch-screen display 116, power management IC 214 connected to battery 216, cellular modem 218, communication device(s) 222, and/or other device(s) 224 that are connected to processor 114 through various communication signals and interfaces. I/O device(s) 118 generally includes buttons and other user interface components that may be employed in mobile computing device 110. For example, I/O device(s) 118 may include a set of buttons, (e.g., back, menu, home, search, etc.), off-screen gesture area, click-wheel, scroll-wheel, QWERTY keyboard, etc. Other device(s) 224 may include, for example, GPS devices, LAN connectivity, microphones, speakers, cameras, accelerometers, and/or MS/MMC/SD/SDIO card interfaces. External display interface 220 may be any suitable display interface (e.g., VGA, DVI, HDMI, etc.).

Processor 114 may be an ARM-based mobile processor. In embodiments, mobile processor 114 is a mobile ARM-based processor such as Texas Instruments OMAP3430, Marvell PXA320, Freescale iMX51, or Qualcomm QSD8650/8250. However, mobile processor 114 may be another suitable ARM-based mobile processor or processor based on other processor architectures such as, for example, x86-based processor architectures or other RISC-based processor architectures.

While FIG. 2 illustrates one exemplary hardware implementation 112 for mobile computing device 110, other architectures are contemplated as within the scope of the invention. For example, various components illustrated in FIG. 2 as external to mobile processor 114 may be integrated into mobile processor 114. Optionally, external display interface 220, shown in FIG. 2 as integrated into mobile processor 114, may be external to mobile processor 114. Additionally, other computer architectures employing a system bus, discrete graphics processor, and/or other architectural variations are suitable for employing aspects of the present invention.

Figure 3:
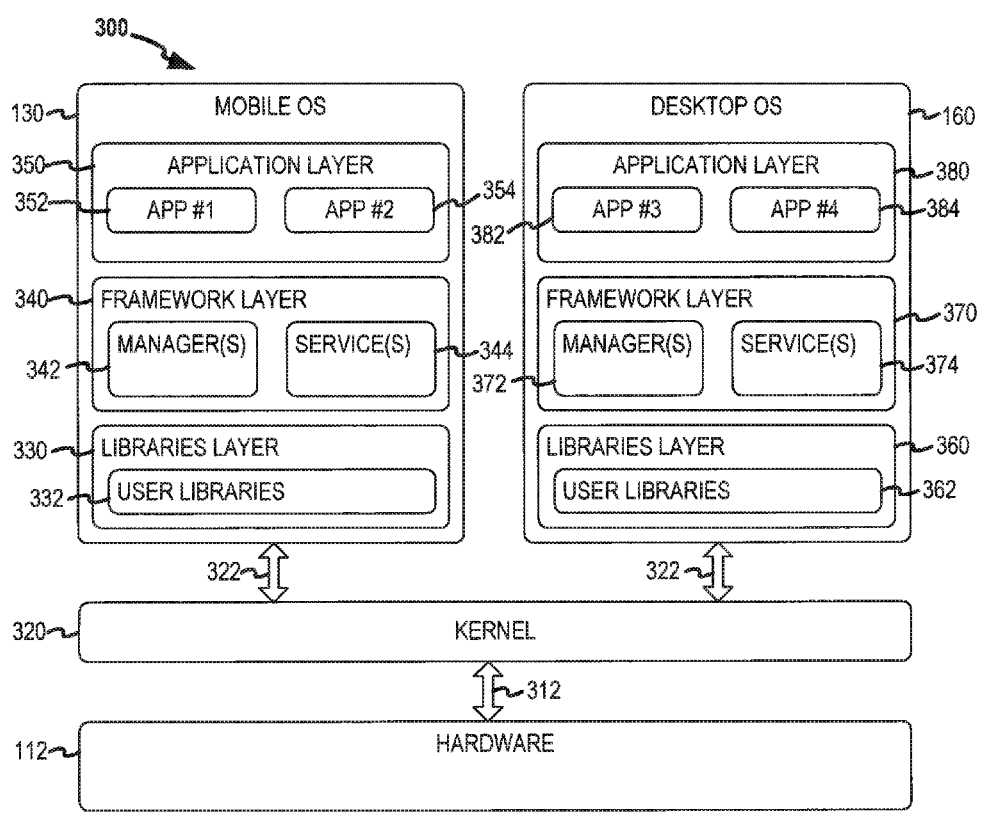
FIG. 3 illustrates an operating system architecture for a computing environment, according to various embodiments.

FIG. 3 illustrates OS architecture 300 that may be employed to run mobile OS 130 and desktop OS 160 concurrently on mobile computing device 110, according to various embodiments. As illustrated in FIG. 3, mobile OS 130 and desktop OS 160 are independent operating systems. Specifically, mobile OS 130 and desktop OS 160 may have independent and incompatible user libraries and/or framework layers. Functions and instructions for OS architecture 300 may be stored as computer program code on a tangible computer readable medium of mobile computing device 110. For example, instructions for OS architecture 300 may be stored in storage device(s) 208 of mobile computing device hardware 112.

As illustrated in FIG. 3, mobile OS 130 has libraries layer 330, application framework layer 340, and application layer 350. In mobile OS 130, applications 352 and 354 run in application layer 350 supported by application framework layer 340 of mobile OS 130. Application framework layer 340 includes manager(s) 342 and service(s) 344 that are used by applications running on mobile OS 130. For example, application framework layer 340 may include a window manager, activity manager, package manager, resource manager, telephony manager, gesture controller, and/or other managers and services for the mobile environment. Application framework layer 340 may include a mobile application runtime environment that executes applications developed for mobile OS 130. The mobile application runtime environment may be optimized for mobile computing resources such as lower processing power or limited memory space. The mobile application runtime environment may rely on the kernel for process isolation, memory management, and threading support. Libraries layer 330 includes user libraries 332 that implement common functions such as I/O and string manipulation ("standard C libraries"), graphics libraries, database libraries, communication libraries, and/or other libraries.

As illustrated in FIG. 3, desktop OS 160 has libraries layer 360, framework layer 370, and application layer 380. In desktop OS 160, applications 382 and 384 run in application layer 380 supported by application framework layer 370 of desktop OS 160. Application framework layer 370 includes manager(s) 372 and service(s) 374 that are used by applications running on desktop OS 160. For example, application framework layer 370 may include a window manager, activity manager, package manager, resource manager, and/or other managers and services common to a desktop environment. Libraries layer 360 may include user libraries 362 that implement common functions such as I/O and string manipulation ("standard C libraries"), graphics libraries, database libraries, communication libraries, and/or other libraries.

In various embodiments of the present disclosure, desktop OS 160 runs in a separate execution environment from mobile OS 130. For example, mobile OS 130 may run in a root execution environment and desktop OS 160 may run in a secondary execution environment established under the root execution environment. Processes and applications running on mobile OS 130 access user libraries 332, manager(s) 342 and service(s) 344 in the root execution environment. Processes and applications running on desktop OS 160 access user libraries 362, manager(s) 372 and service(s) 374 in the secondary execution environment.

Generally applications developed for mobile OS 130 do not run directly on desktop OS 160, and applications developed for desktop OS 160 do not run directly on mobile OS 130. For example, application 382 running in application layer 380 of desktop OS 160 may be incompatible with mobile OS 130, meaning that application 382 could not run on mobile OS 130. Specifically, application 382 may use manager(s) 372 and service(s) 374 of application framework layer 370 of desktop OS 160 that are either not available or not compatible with manager(s) 342 and service(s) 344 in application framework layer 340 in mobile OS 130. In addition, application 382 may attempt to access user libraries 362 that exist in libraries layer 360 of desktop OS 160 but are either not available or not compatible with user libraries 332 available in libraries layer 330 of mobile OS 130.

In OS architecture 300, mobile OS 130 and desktop OS 160 run concurrently on shared kernel 320. This means that mobile OS 130 and desktop OS 160 are running on shared kernel 320 at the same time. Specifically, mobile OS 130 and desktop OS 160 both interface to shared kernel 320 through the same kernel interface 322, for example, by making system calls to shared kernel 320. Shared kernel 320 manages task scheduling for processes of both mobile OS 130 and desktop OS 160. In this regard, mobile OS 130 and desktop OS 160 are running independently and concurrently on shared kernel 320. In addition, shared kernel 320 runs directly on mobile processor 114 of mobile computing device hardware 112, as illustrated by hardware interface 312. Specifically, shared kernel 320 directly manages the computing resources of mobile computing device hardware 112 such as CPU scheduling, memory access, and I/O. In this regard, hardware resources are not virtualized, meaning that mobile OS 130 and desktop OS 160 make system calls through kernel interface 322 without virtualized memory or I/O access.

There are several known techniques for providing multiple OSs on the same computing device. However, none of these techniques provide multiple different OSs running concurrently and independently on a shared kernel. More particularly, none of these techniques provide a solution for a mobile OS and a desktop OS running on a shared kernel.

In one technique, known as dual-boot, multiple OSs are loaded on the computing device one at a time. For example, at boot time, a user may select one OS from multiple available OSs to be run on the device, where each OS has its own kernel, libraries, framework, and applications. The system then boots up into that operating system and the other OS(s) are not running (i.e., no processes of the other OS(s) are loaded concurrently with the running OS). Therefore, this technique does not run multiple OSs on a shared kernel, nor does this technique run multiple OSs concurrently.

Another technique for running multiple OSs on the same device is to use a Virtual Machine Manager ("VMM"), or "Hypervisor." A VMM or Hypervisor runs directly on the hardware and separates the individual kernels of each OS from the hardware, controlling which computer hardware resources are available to each OS at any given time. A Hypervisor effectively creates multiple virtual machines from one device, such that each OS sees a separate virtual machine. Therefore, multiple OSs running on the same device through Hypervisor and VMM are not running on a shared kernel. The Hypervisor adds system overhead due to each OS having to access system resources through virtualization in the Hypervisor. Additionally, because the Hypervisor must allocate CPU and other computing resources, each OS may not be able to effectively schedule processes and tasks.

Yet another technique for running multiple OSs on the same device is to use a hosted virtual machine. In this technique, each OS has its own kernel, with the kernel of the guest OS running on a virtual machine in the host OS. The virtual machine may be a virtualized hardware platform different than the physical hardware platform. The virtual machine in the host OS may be implemented in the kernel of the host OS. In this instance, the kernel of the host OS acts as a hypervisor through which the kernel of the guest OS accesses the processor and hardware resources. Regardless of where the virtual machine is implemented in this technique, the host OS and the guest OS have separate kernels. Therefore, hosted virtual machines do not have multiple OSs running on a shared kernel. System performance using this technique may be reduced due to virtualization of hardware resources for the guest OS.

Another form of virtualization is operating system level virtualization. In this technique, multiple isolated user-space instances may be created on the kernel of an operating system, which look like separate OS instances from the point of view of users of each user-space instance. In this technique, the host OS and guest OS(s) must be the same OS. Accordingly, this technique does not provide a solution for a mobile OS and desktop OS running independently and concurrently on a shared kernel. Further, similarly to a hosted virtual machine, this technique uses disk space and memory virtualization for the guest OS(s). Accordingly, this technique does not provide direct access to memory and system resources for each concurrent OS.

These techniques of running multiple OSs have limitations with regard to running both operating systems concurrently and independently. For example, virtualization involves setting up a distinct address space for the guest OS and simulating I/O to the guest OS. Therefore, access to hardware including system memory has higher overhead for the guest OS using virtualization. Additionally, techniques using Hypervisors result in lack of certainty in process control of each OS. Specifically, the Hypervisor manages the amount of CPU time allocated to each OS, and each OS then allocates CPU time for processes within the OS, without knowledge of what is occurring in the other OS. In this regard, high priority processes within one OS may not be given the required CPU time to complete their tasks because the OS is sharing CPU time through the Hypervisor, which cannot account for the relative priorities of processes running within each OS. Because processing power may be limited in mobile processor architectures relative to desktop processor architectures, techniques that depend on virtualization, including hypervisors, and operating system level virtualization, may not offer optimal performance for a desktop OS running concurrently with a mobile OS on a mobile processor.

Figure 4:
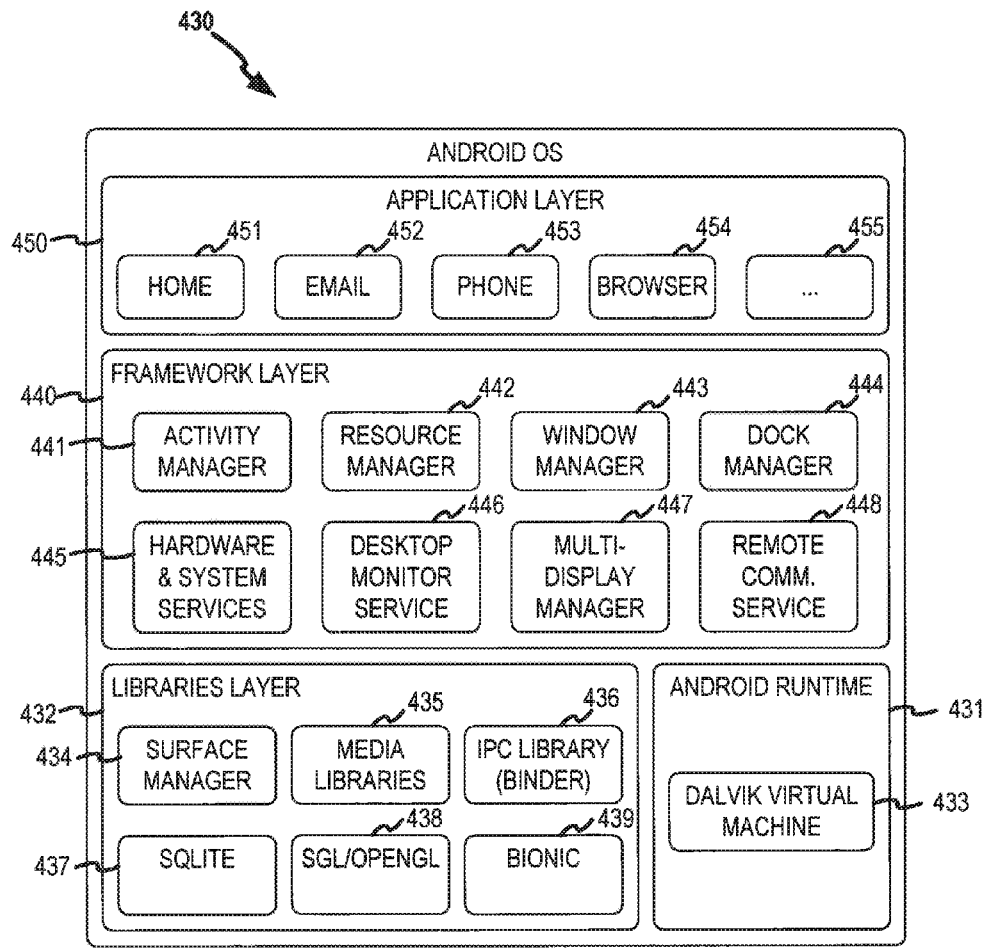
FIG. 4 illustrates one embodiment of a mobile operating system for a mobile computing device, according to various embodiments.
Figure 5:
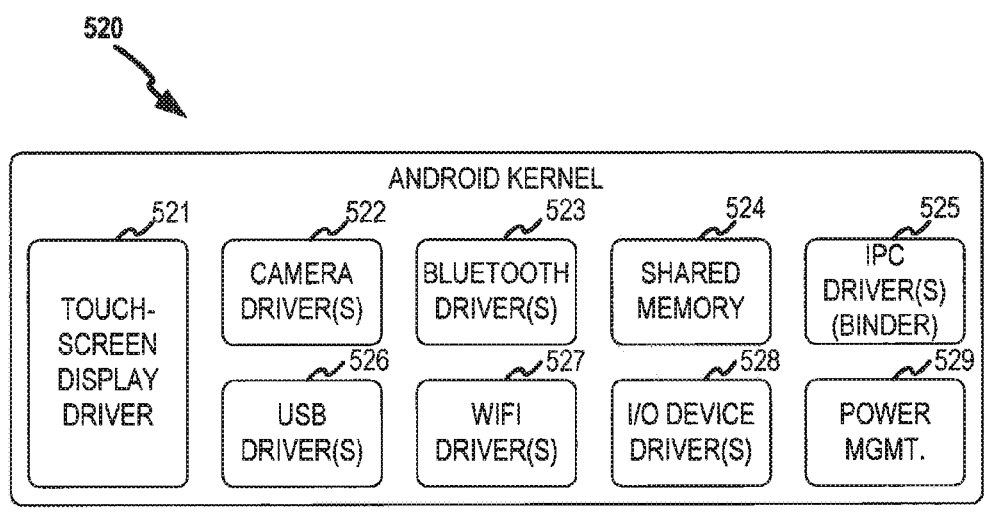
FIG. 5 illustrates aspects of an operating system architecture for a computing environment, according to various embodiments.
Figure 6:
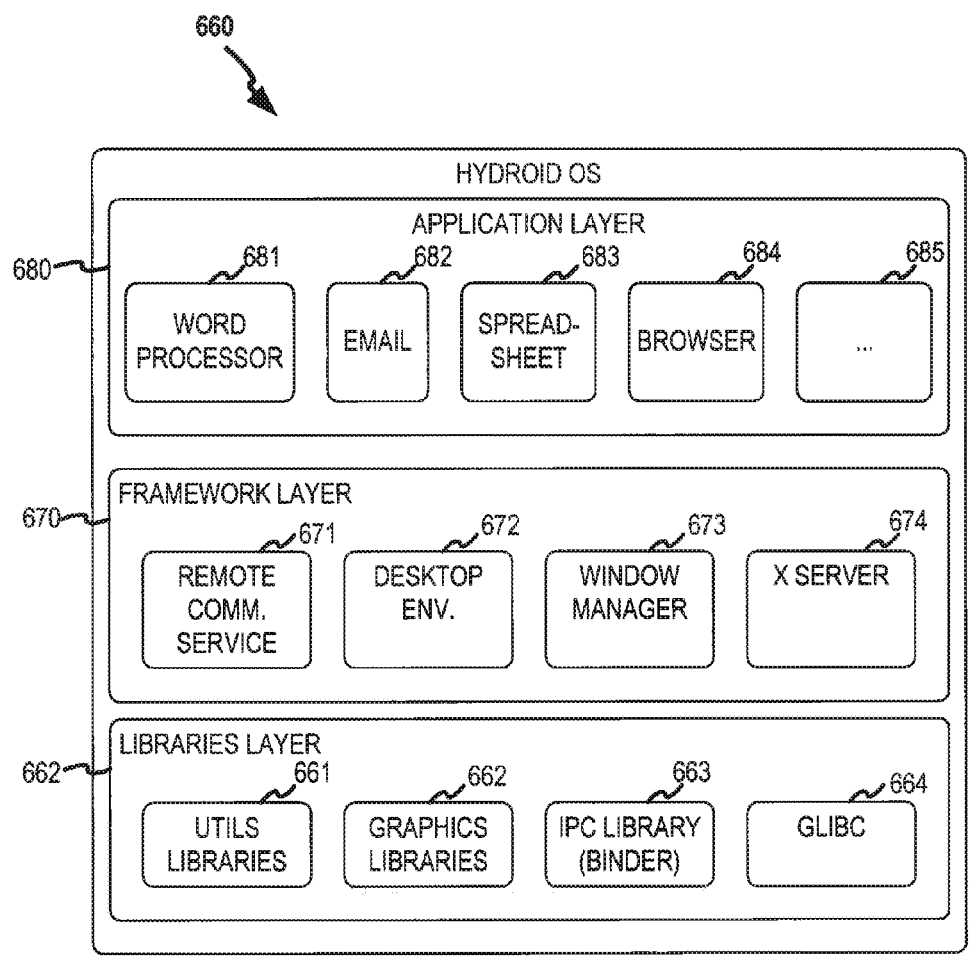
FIG. 6 illustrates a desktop operating system that may be employed in a multiple operating system computing architecture, according to various embodiments.

In one embodiment consistent with OS architecture 300, an Android mobile OS and a full Linux OS run independently and concurrently on a modified Android kernel. In this embodiment, the Android OS may be a modified Android distribution while the Linux OS ("Hydroid") may be a modified Debian Linux desktop OS. FIGS. 4-6 illustrate Android mobile OS 430, Android kernel 520, and Hydroid OS 660 that may be employed in OS architecture 300 in more detail, according to various embodiments.

As illustrated in FIG. 4, Android OS 430 includes a set of C/C++ libraries in libraries layer 432 that are accessed through application framework layer 440. Libraries layer 432 includes the "bionic" system C library 439 that was developed specifically for Android to be smaller and faster than the "glibc" Linux C-library. Libraries layer 432 also includes inter-process communication ("IPC") library 436, which includes the base classes for the "Binder" IPC mechanism of the Android OS. Binder was developed specifically for Android to allow communication between processes and services. Other libraries shown in libraries layer 432 in FIG. 4 include media libraries 435 that support recording and playback of media formats, surface manager 434 that managers access to the display subsystem and composites graphic layers from multiple applications, 2D and 3D graphics engines 438, and lightweight relational database engine 437. Other libraries that may be included in libraries layer 432 but are not pictured in FIG. 4 include bitmap and vector font rendering libraries, utilities libraries, browser tools (i.e., WebKit, etc.), and/or secure communication libraries (i.e., SSL, etc.).

Application framework layer 440 of Android OS 430 provides a development platform that allows developers to use components of the device hardware, access location information, run background services, set alarms, add notifications to the status bar, etc. Framework layer 440 also allows applications to publish their capabilities and make use of the published capabilities of other applications. Components of application framework layer 440 of Android mobile OS 430 include activity manager 441, resource manager 442, window manager 443, dock manager 444, hardware and system services 445, desktop monitor service 446, multi-display manager 447, and remote communication service 448. Other components that may be included in framework layer 440 of Android mobile OS 430 include a view system, telephony manager, package manager, location manager, and/or notification manager, among other managers and services.

Applications running on Android OS 430 run within the Dalvik virtual machine 431 in the Android runtime environment 433 on top of the Android object-oriented application framework. Dalvik virtual machine 431 is a register-based virtual machine, and runs a compact executable format that is designed to reduce memory usage and processing requirements. Applications running on Android OS 430 include home screen 451, email application 452, phone application 453, browser application 454, and/or other application(s) ("App(s)") 455.

For these reasons, applications written for Android do not generally run on Hydroid OS 660 and applications written for standard Linux distributions do not generally run on Android OS 430. In this regard, applications for Android OS 430 and Hydroid OS 660 are not bytecode compatible, meaning compiled and executable programs for one do not run on the other.

FIG. 5 illustrates modified Android kernel 520 in more detail, according to various embodiments. Modified Android kernel 520 includes touch-screen display driver 521, camera driver(s) 522, Bluetooth driver(s) 523, shared memory allocator 524, IPC driver(s) 525, USB driver(s) 526, WiFi driver(s) 527, I/O device driver(s) 528, and/or power management module 530. I/O device driver(s) 528 includes device drivers for external I/O devices, including devices that may be connected to mobile computing device 110 through port 120. Modified Android kernel 520 may include other drivers and functional blocks including a low memory killer, kernel debugger, logging capability, and/or other hardware device drivers.

FIG. 6 illustrates Hydroid OS 660 in more detail, according to various embodiments. Hydroid is a full Linux OS that is capable of running almost any application developed for standard Linux distributions. In particular, libraries layer 662 of Hydroid OS 660 includes Linux libraries that support networking, graphics processing, database management, and other common program functions. For example, user libraries 662 may include the standard Linux C library (glibc) 664, Linux graphics libraries 662 (e.g., GTK, etc.), Linux utilities libraries 661, Linux database libraries, and/or other Linux user libraries. Applications run on Hydroid within an X-Windows Linux graphical environment using X-Server 674, window manager 673, and/or desktop environment 672. Illustrated applications include word processor 681, email application 682, spreadsheet application 683, browser 684, and other application(s) 685.

In one embodiment, Hydroid OS 660 includes components of a cross-environment communication framework that facilitates communication with Android OS 430 through shared kernel 520. These components include IPC library 663 that includes the base classes for the Binder IPC mechanism of the Android OS and remote communications service 671.

In one embodiment, Hydroid OS 660 is run within a chrooted (created with the 'chroot' command) secondary execution environment created within the Android root environment. Processes and applications within Hydroid OS 660 are run within the secondary execution environment such that the apparent root directory seen by these processes and applications is the root directory of the secondary execution environment. In this way, Hydroid OS 660 can run programs written for standard Linux distributions without modification because Linux user libraries 662 are available to processes running on Hydroid OS 660 in the chrooted secondary execution environment.

In preemptive multi-tasking operating systems, direct communication between independent processes is typically prevented for security and reliability reasons. Instead, a form of IPC must be used to send information across process boundaries (i.e., between process address spaces). Objects sent from one process to another process must be marshaled across the process boundaries. Marshaling is the process of packaging and unpackaging data and parameters so an IPC communication can take place. Some forms of IPC can be used to pass information between processes on different computers on a network. One method of IPC is to allow a process in one address space to cause a subroutine or procedure to execute in another address space. This method of IPC is called a remote procedure call ("RPC").

Some methods of IPC are platform independent. For example, Internet sockets or network sockets are a mechanism of bidirectional IPC across an Internet Protocol ("IP") based computer network. Internet sockets can be used to deliver data packets to application processes or threads based on local or remote IP addresses and port numbers. The operating systems of each local or remote machine maintain mappings of each socket to the appropriate application process or thread.

Referring back to FIG. 3, OS architecture 300 includes OS 130 and desktop OS 160 running concurrently on shared kernel 320. As illustrated in FIG. 1, mobile computing device 110 can be docked with secondary terminal environment 140. Secondary terminal environment 140 may have a user experience profile that is associated with desktop OS 160. In this instance, mobile OS 130 provides a mobile computing experience through touch-screen display 116 and I/O devices 118 of mobile computing device hardware 112. At the same time, desktop OS 160 provides a desktop computing experience through secondary terminal environment 140.

Accordingly, the user is able to use and interact with mobile applications (for example, applications 352 and 354) running on mobile OS 130 through the mobile computing experience provided on the user interface components of mobile computing device 110 while using and interacting with desktop applications (for example, applications 382 and 384) running on desktop OS 160 through secondary terminal environment 140. In this instance, applications of mobile OS 130 are independent from applications of desktop OS 160. In this regard, settings, user preferences, user data, and application states of applications of mobile OS 130 are separate and independent from settings, user preferences, user data, and application states of applications of desktop OS 160. For example, application 352 of mobile OS 130 and application 382 of desktop OS 160 may be spreadsheet applications. When the user opens a spreadsheet file with application 352 and begins editing data, the spreadsheet file and associated data are locked by application 352. Application 382 is not able to access the edited spreadsheet data as that data is maintained in the process space of application 352.

Embodiments of the invention include a cross-environment communications framework that extends IPC between applications and services of a mobile OS running on a shared kernel and applications and services of a desktop OS running on the same shared kernel. The cross-environment communications framework supports communication between applications of the desktop OS and applications and services of the mobile OS. The cross-environment communications framework also supports communication between mobile OS applications and other mobile OS applications.

Figure 7:
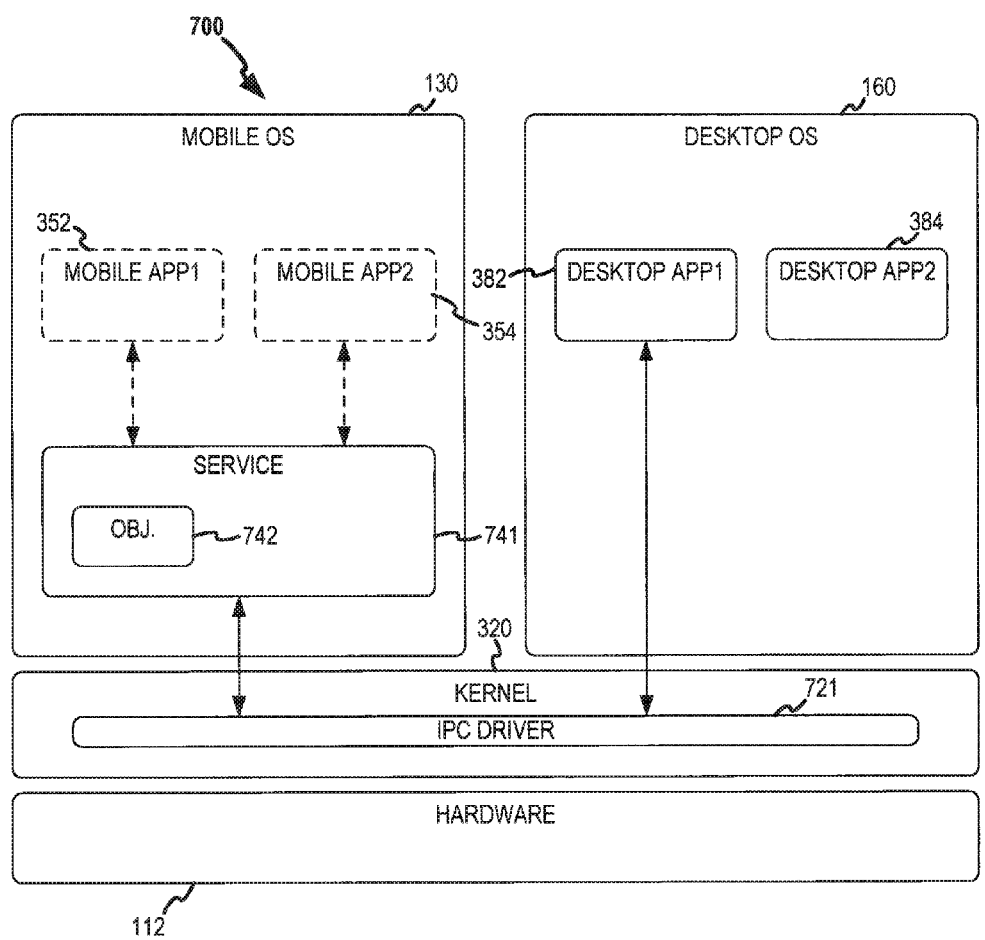
FIG. 7 illustrates aspects of a cross-environment communications framework, according to various embodiments.

FIG. 7 illustrates one embodiment of a cross-environment communications framework. In cross-environment communications framework 700, mobile application 352, service 741, and other mobile application(s) and service(s) 354 run on mobile OS 130 while desktop applications 382 and 384 run on desktop OS 160. Each application and service includes one or more processes, with each process having its own process space.

Services are components that perform background operations (i.e., not directly involving user interaction with the application) for applications and/or assist in interactions between applications and hardware. While various operating systems may refer to these components by other names, a service, as used herein, is intended to be construed broadly as a component including one or more processes that implements functionality not directly involving user interaction that may be used by applications, the operating system, and/or other services.

As illustrated in FIG. 7, desktop application 382, running on desktop OS 160, communicates with service 741 running on mobile OS 130 through an inter-process communication channel that includes IPC driver 721 in kernel 320. Initially, desktop application 382 sends a call through IPC driver 721 to bind to service 741. Service 741 creates an instance of a remotable object 742, which defines the IPC interface through which desktop application 382 communicates with service 741. Service 741 returns remotable object 742 to desktop application 382 through IPC driver 721. Subsequently, desktop application 382 can make calls to remotable object 742 to communicate with service 741 through IPC driver 721.

In one form of communication of cross-environment communication framework 700, desktop application 382 may call remotable methods of service 741 by making calls to remotable object 742. A call to remotable object 742 may include zero or more parameters passed to a remotable method of service 741 and/or zero or more parameters to be returned from the remotable method of service 741. Parameters are parceled by the IPC interface to the remotable object and marshaled across process boundaries by IPC driver 721. In this regard, desktop application 382 may pass parameters in a call to remotable object 742 in the form of a parcel object. IPC driver 721 marshals the parcel object to the process space of service 741. Service 741 unparcels the parcel object and performs the remotable method in its process space using the unparceled parameters and returns another parcel object to desktop application 382. The returned parcel object may include a reference to the remotable object.

Calls to the remotable object may be synchronous or asynchronous. For example, if desktop application 382 makes a synchronous call to the remotable object, the calling thread in desktop application 382 blocks and waits for the return from the remotable object before continuing. Alternatively, if desktop application 382 makes an asynchronous call to the remotable object, the calling thread in desktop application 382 continues and does not wait for the call to the remotable object to return.

Remotable object 742 allows desktop application 382 and service 741 to both access a shared memory space in a thread-safe manner. For example, a reference to the shared memory space may be included in parcel objects passed by calls to remotable object 742. Because remotable object 742 is reference counted across process boundaries, application 382 and service 741 can share memory across process boundaries in a thread-safe manner. In various instances, the reference to a shared memory space may be a file descriptor or file handle.

In embodiments, service 741 may be a core service of the mobile OS such as a telephony service, camera service, location service. Service 741 may also be a custom service that performs operations related to an application of mobile OS 130 or desktop OS 160.

In one embodiment, service 741 may be a service that enables app-to-app communication. For example, service 741 may be a remote communications service that implements aspects of the cross-environment communications framework to provide app-to-app communication between applications running on mobile OS 130. The remote communication service may also enable communication between desktop applications running on desktop OS 160 and mobile applications running on mobile OS 130. In one embodiment, remote communication service 448 of Android OS 430 facilitates app-to-app communication between applications running on Android OS 430 and/or Hydroid OS 660.

For example, mobile application 352 may bind to service 741. Service 741 then instantiates remotable object 742 and returns remotable object 742 to mobile application 352. Mobile application 354 may also bind to service 741 and service 741 may return remotable object 742 to mobile application 354. With mobile applications 352 and 354 may communicate through calls to remotable object 742. For example, mobile application 352 may pass parcel objects using calls to remotable object 742. The parcel objects may include data and/or references to shared memory. Mobile application may access the shared memory by also making calls to remotable object 742. In the same manner, desktop application 382 may also bind to service 741 and communicate with mobile applications 352 and 354 using calls to remotable object 742.

In one embodiment, Android mobile OS 430 and a Linux desktop OS 660 run concurrently on shared kernel 520. The Android OS includes a lightweight remote procedure call mechanism called "Binder." The Binder mechanism uses shared memory to achieve efficient, secure IPC. The Binder mechanism includes Binder IPC driver 525 in the Android kernel 520 and user class libraries including Binder IPC library 436 that contain the base classes for Binder objects. In Android OS 430, Binder IPC library 436 is compiled against Bionic C library 439. A Binder reference is a descriptor maintained by Binder driver 525 to an interface of a remotable Binder object. A process can call the remotable Binder object through the interface. The Android Binder mechanism provides reference counting and manages mapping of object references across processes. However, the Android Binder mechanism only provides communication between Android applications and globally registered Android services. Therefore, Android applications may not communicate directly with each other through the Binder mechanism.

The IPC mechanisms available in the Linux OS are pipes, named pipes, system V message queues, system V semaphores, system V shared memory segments, and networking sockets. These IPC mechanisms are not directly compatible with the Binder IPC mechanism in the Android OS or the Binder kernel driver used for the Android Binder IPC mechanism. Therefore, Linux applications running cannot use these standard Linux IPC mechanisms to communicate with applications and/or service(s) running on an Android OS.

In one embodiment, the cross-environment communications framework extends the Binder mechanism to allow applications of Linux desktop OS 660 to access services of Android OS 430. In one embodiment, the cross-environment communication framework includes a remote communication service that allows app-to-app communication within Android OS 430. In other embodiments, the remote communication service allows Linux applications running on Linux desktop OS 660 to communicate with Android applications running on Android OS 430.

In embodiments, the cross-environment communications framework also supports use of the user datagram protocol ("UDP") for cross-environment communication. UDP is part of the suite of protocols of the Internet Protocol ("IP"). UDP is an asynchronous data transmission mechanism without an implicit handshaking dialogue. Accordingly, UDP does not provide a reliable transmission protocol, not does it guarantee data ordering or data integrity during transmission. However, because UDP has minimal overhead, it may be a preferable transmission mechanism for time-sensitive information in a real-time system. For example, where dropping packets is preferable to delaying transmission, UDP may be a preferred transmission mechanism.

Figure 8:
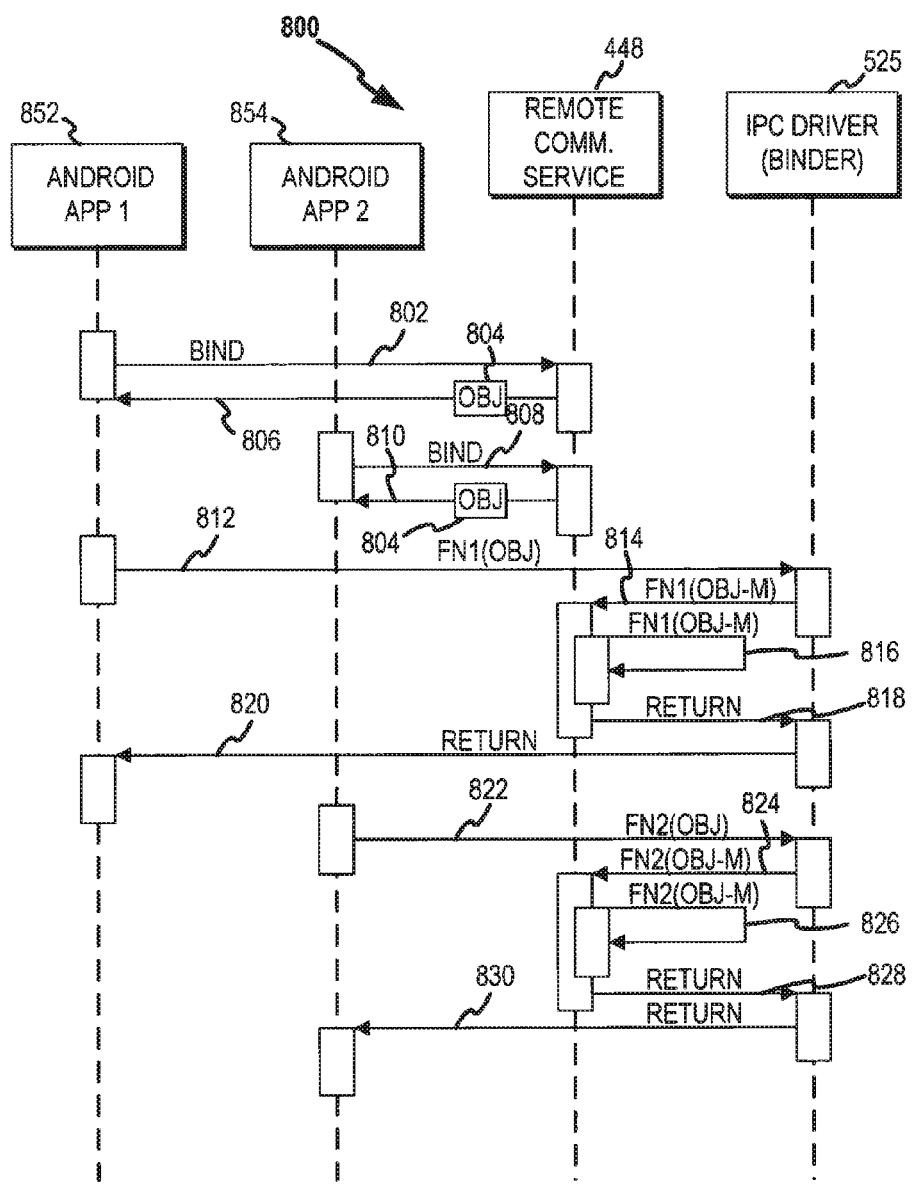
FIG. 8 illustrates a communication flow employing aspects of the cross-environment communications framework, according to various embodiments.

FIG. 8 illustrates communication flow 800 employing aspects of the cross-environment communications framework, according to various embodiments. In communication flow 800, Android application 852, running on Android OS 430, registers with remote communication service 448 by calling a method of the Android OS context as illustrated by process step 802. In response, remote communication service 448 returns an interface to a remotable object 804 (e.g., Binder object) at step 806. At step 808, Android application 854 registers with remote communication service 448. Remote communication service 448 returns an interface to the same remotable object 804 to Android application 854 at step 810.

Android application 852, running on Android OS 430, can communicate with Android application 854 using remotable object 804 by making calls to the remotable object. Calls to the remotable object may include remote method invocations and/or parceled data. The parceled data may include various data types including integers, strings, arrays, and/or file descriptors, among other possible data types. At step 812 of communication flow 800, Android application 852 invokes remote method FN1 of remote communication service 448. Kernel IPC driver 525 marshals the remote call across the process boundaries and remote communication service 448 receives the call to the remotable object at step 814. Remote communication service 448 then unparcels data of the remote call and runs the remote method in its process space using the data at step 816. Remote communication service 448 returns another parcel object through the interface to the remotable object at steps 818 and 820.

At step 822, Android application 854 makes a call to remotable object 804. For example, Android application 854 may invoke a remote method (FN2) of remote communication service 448. Application 854 may pass a parcel object to the remote method that includes parameters for the remote method. Kernel IPC driver 525 marshals the parcel object to the process space of remote communication service 448 and remote communication service 448 receives the parcel object at step 824. Remote communication service 448 then unparcels the data and runs the remote method in its process space using the data at step 826. Remote communication service 448 returns another parcel object through the interface to the remotable object at step 828. Kernel IPC driver 525 marshals the parcel object across the process boundaries and Android application 854 receives the parcel object at step 830.

In one embodiment, remote communication service 448 may be a bound service of Android OS 430. In this embodiment, the bound service is created by Android OS 430 when an client binds to the service through the Context class of Android OS 430. The bound service runs as long as clients (applications and/or services that bind to the service) are bound to the service and is destroyed when the last client unbinds from the service. The bound service may implement a shared memory interface allowing clients to share user preferences, settings, and/or user data.

Communications flow 800 provides thread-safe cross-process communication for sharing data between Android applications 852 and 854 running on Android OS 430. Android applications 852 and 854 may share data in a shared memory space in a thread-safe manner by passing references to the shared data using remotable object 804. For example, Android applications 852 and 854 may pass a parcel object that includes a reference to a shared memory space through remotable object 804.

Communications flow 800 illustrates synchronous communication between Android applications 852 and 854 and remote communication service 448. However, communication between Android applications 852 and 354 and remote communication service 448 may be asynchronous, meaning that Android applications 852 and 854 will return immediately from calls to the remotable object and not wait for a result from the remote method invocation.

Figure 9:
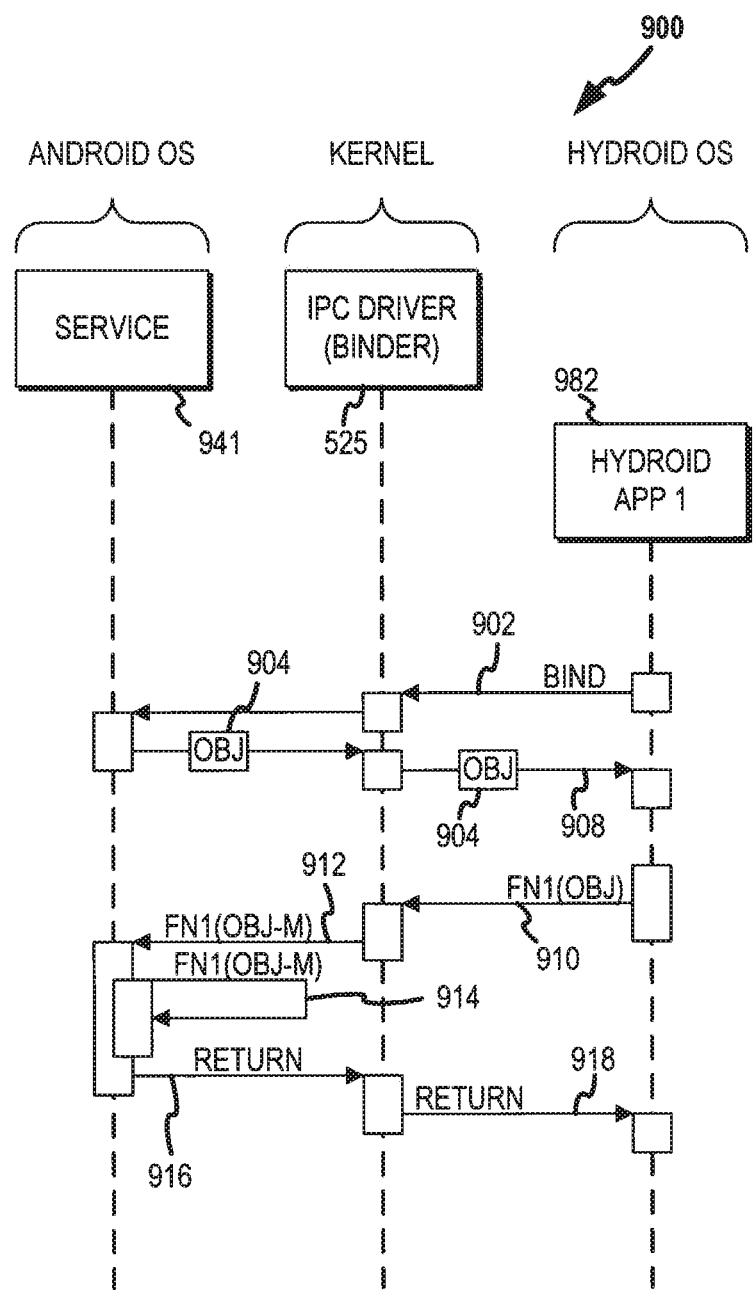
FIG. 9 illustrates an alternative communication flow employing aspects of the cross-environment communications framework, according to various embodiments.

FIG. 9 illustrates communication flow 900 employing aspects of the cross-environment communications framework, according to various embodiments. In communication flow 900, application 682 running on Hydroid OS 660 communicates with service 941 of Android OS 430.

Service 941 exposes a Binder interface to clients and at step 902, Hydroid application 982 registers with service 941 by binding to service 941 using the exposed interface though Binder kernel driver 525. Service 941 returns in interface to a remotable object 904, which Hydroid application 982 receives at step 908. At step 910, Hydroid application 382 makes a call to remotable object 904. For example, Hydroid application 382 may invoke a remotable method (FN1) of service 941. The remote method call may include a parcel object that includes parameters for the remote method call. Binder driver 525 marshals the parcel object to the process space of service 941 and service 941 receives the data at step 912. Service 941 unparcels the data and runs the method in its process space using the unparceled data at step 914. Service 941 returns a parcel object that includes return values of the method through binder driver 525 at steps 916 and 918. Using communication flow 900, Hydroid application 982, running on Hydroid OS 660, can access methods and data of service 941 of Android OS 430.

Communications flow 900 provides thread-safe cross-process communication for sharing data between processes of Android OS 430 and applications of Hydroid OS 660. For example, Hydroid application 982 may access shared data of services of Android OS 430 through shared memory by passing references to the shared memory using remotable object 904.

Communication flow 900 may be used to allow applications running on Hydroid OS 660 to access various services of Android OS 430. For example, service 941 of Android OS 430 may be a core service of Android OS 430 such as a telephony service, camera service, location service, etc. Alternatively, service 941 may be a custom service such as remote communication service 448.

Figure 10:
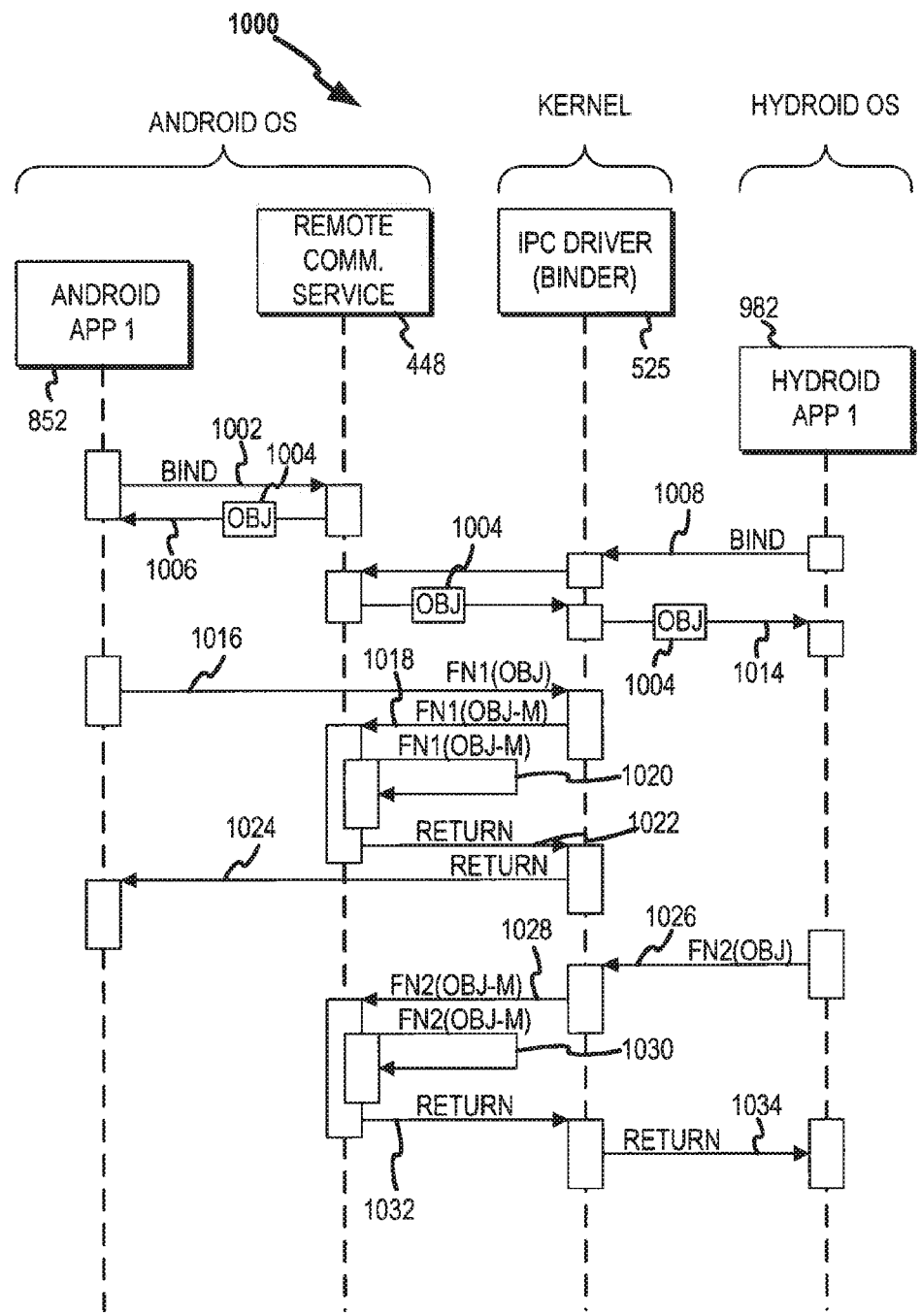
FIG. 10 illustrates an alternative communication flow employing aspects of the cross-environment communications framework, according to various embodiments.

FIG. 10 illustrates communication flow 1000 employing the cross-environment communications framework, according to various embodiments. Initially, remote communication service 448 exposes a binder interface to clients. At step 1002, Android application 852 of Android OS 430 registers with remote communication service 448 (i.e., binds to remote communication service 448). Remote communication service 448 instantiates a remotable object 1004 and returns remotable object 1004 to Android application 852 at step 1006.

At step 1008, Hydroid application 982 of Hydroid OS 660 registers with remote communication service 448 by binding to remote communication service 448 using the exposed interface though binder kernel driver 525. Remote communication service 448 returns remotable object 1004, which Hydroid application 982 receives at step 1014.

At step 1016, Android application 852 makes a call to remotable object 1004. For example, Android application 852 may invoke a remote method (FN1) of remote communication service 448. Android application 852 may pass a parcel object to the remote method that includes parameters for the remote method. The parcel object may include a reference to a shared memory space. Binder driver 525 marshals the parceled data across the process boundaries and remote communication service 448 receives the data at step 1018. Remote communication service 448 unparcels the data and runs the method in its process space using the unparceled data at step 1020 and returns the remotable object through binder driver 525 at steps 1022 and 1024.

At step 1026, Hydroid application 982 calls a remote method (FN2) of remote communication service 448 through the remotable object 1004. The remote method call may include data that is parceled into remotable object 1004. Binder driver 525 marshals the parceled data across the process boundaries and remote communication service 448 receives the data at step 1028. Remote communication service 448 then unparcels the data and runs the method in its process space using the data at step 1030 and returns remotable object 1004 through binder driver 525 at steps 1032 and 1034.

Communications flow 1000 provides thread-safe cross-process communication for sharing data between applications of Android OS 430 and applications of Hydroid OS 660. For example, Hydroid application 982 of Hydroid OS 660 and Android application 852 of Android OS 430 may share data through shared memory by passing references to the shared memory using remotable object 1004. In communications flow 1000, Android application 852 and Hydroid application 982 block on return of the remote method invocation. Accordingly, communications flow 1000 provides synchronous communication between Android application 852 and Hydroid application 982. However, remote method invocations from Android application 352 and Hydroid application 982 may be asynchronous, meaning that applications 852 and 982 will return immediately from calls to remotable object 1004 and not wait for a result to be returned.

In one embodiment of communications flow 1000, remote communication service 448 is a bound service of Android OS 430. In this embodiment, the bound service is created by Android OS 430 when either an Android application or a Hydroid application binds to the service. The service may implement a shared memory interface allowing Android applications and Hydroid applications to share user preferences, settings, and/or user data.

In one example consistent with communications flow 1000, Android application 852 and Hydroid application 982 are spreadsheet programs. User data is stored in shared memory accessed through a remotable object. In this example, Android spreadsheet application 852 and Hydroid spreadsheet application 982 both may manipulate the user data by passing a parcel object that includes a reference to the shared memory through calls to remotable object 1004. In this way, Android spreadsheet application 852 and Hydroid spreadsheet application 982 can manipulate user data of a spreadsheet stored in shared memory in a thread-safe manner.

Accordingly, communication flow 1000 allows applications running on Hydroid OS 660 to communicate with applications running on Android OS 430 using the Android Binder mechanism. In this way, Android application 852 running on Android OS 430 and Hydroid application 982 running on Hydroid OS 660 can share settings, user preferences, and/or user data fast and efficiently.

Figure 11:
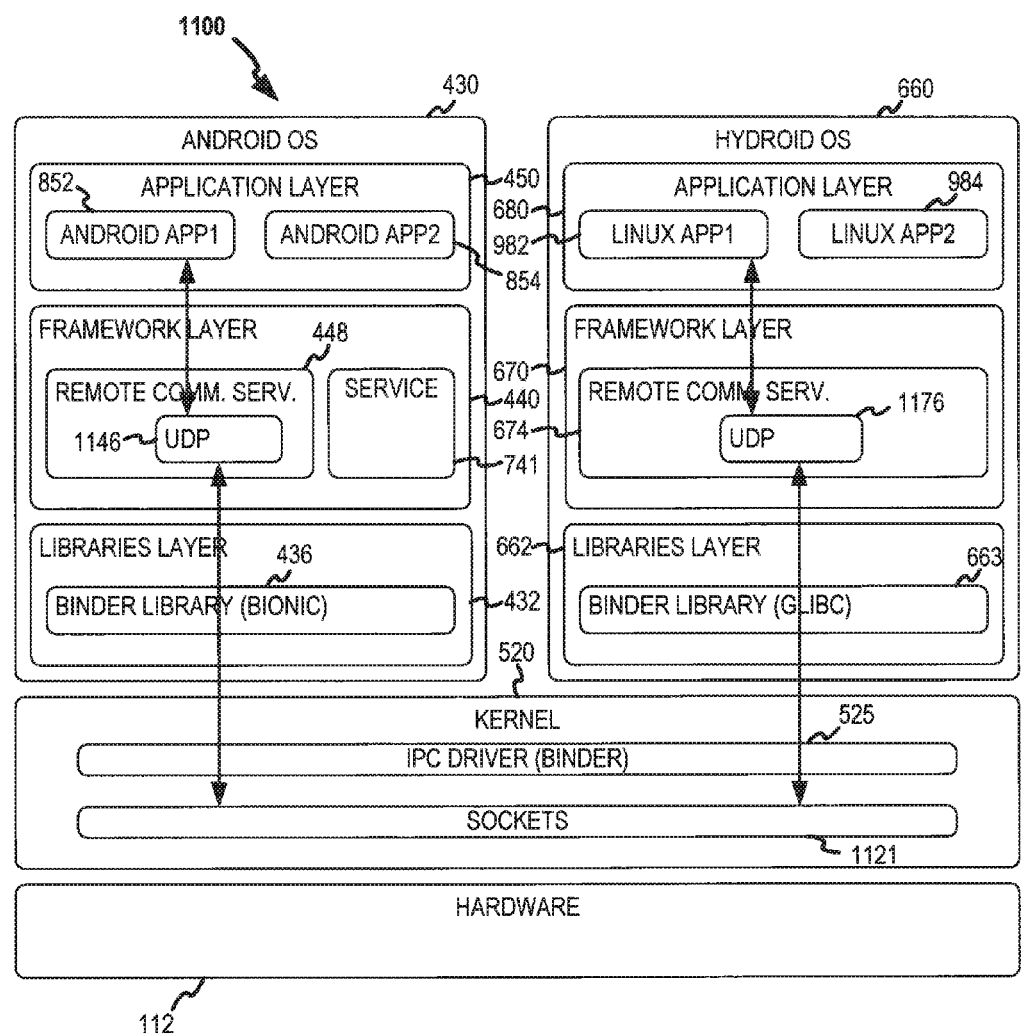
FIG. 11 illustrates an alternative communication flow employing aspects of the cross-environment communications framework, according to various embodiments.

FIG. 11 illustrates communication flow 1100 that employs aspects of the cross-environment communications framework, according to various embodiments. As illustrated in FIG. 11, remote communication service 448 of Android OS 430 includes UDP communication module 1146 and remote communication service 671 of Hydroid OS 660 includes UDP communication module 1176. In communication flow 1100, Hydroid application 982 of Hydroid OS 660 communicates with Android application 852 of Android OS 430 through UDP modules 1146 of Android OS 430 and 1176 of Hydroid OS 660.

In one example, Android application 852 binds to a socket of socket driver(s) 1121 in shared kernel 520 through UDP module 1146. Hydroid application 982 of Hydroid OS 660 also binds to the socket of socket driver(s) 1121 through UDP module 1176. Android application 852 then sends UDP packets to the socket and Hydroid application 982 receives the UDP packets through UDP module 1176 of Hydroid OS 660.

As described above, UDP does not include handshaking for providing reliability or implicit data ordering. Accordingly, communication flow 1100 may be suitable for communications between applications of Android OS 430 and Hydroid OS 660 where data reliability is not a primary concern. For example, communication flow 1100 may be used for a Linux streaming audio client to receive a streaming audio signal from an Android streaming audio application or service. In this instance, it may be more important for the Linux streaming audio client to keep receiving packets through communication flow 1100 rather than wait for handshaking or resending of any dropped packets.

As described above, mobile OSs (e.g., Android, iOS) and desktop OSs (e.g., Linux, Mac OS X) typically have been developed under different system constraints and for different use models. One difference between mobile OSs and desktop OSs may be the use of different IPC mechanisms for communication between processes within the OSs. As a result, it may be difficult to provide inter-process communication between a process running within a mobile OS and a process running in a desktop OS, where the mobile OS and desktop OS are running on the same shared kernel as illustrated in FIG. 7. A solution provided by various embodiments described above uses a single IPC transport mechanism with support provided for the single IPC transport mechanism in both the mobile OS and desktop OS. The embodiments described below provide an alternative solution using an IPC translation mechanism within one of the mobile OS or desktop OS to translate IPC calls from a first IPC transport mechanism to a second IPC transport mechanism. It may be possible using this technique to provide a solution for inter-process communication between processes running within independent OSs that support different IPC mechanisms with fewer modifications to IPC libraries and/or applications.

Figure 12:
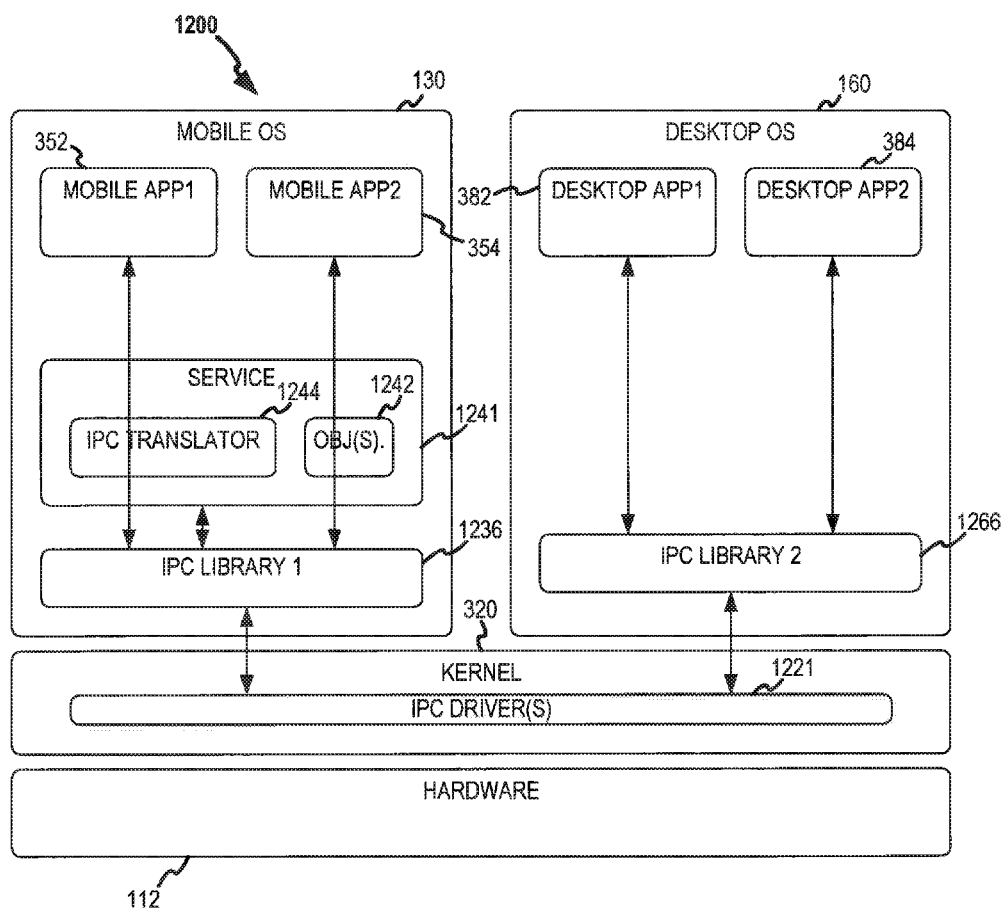
FIG. 12 illustrates a computing environment that provides support for cross-environment inter-process communication using IPC translation, according to various embodiments.

FIG. 12 illustrates computing environment 1200 that provides support for cross-environment inter-process communication using IPC translation, according to various embodiments. In computing environment 1200, a first OS (e.g., mobile OS 130) and a second OS (e.g., desktop OS 160) run concurrently on shared kernel 320. Processes within the first OS use a first IPC mechanism for inter-process communication. For example, the first IPC mechanism may include IPC library 1236 and a first IPC driver of IPC driver(s) 1221 in shared kernel. Processes within the second OS use a second, different IPC mechanism for inter-process communication. For example, the second IPC mechanism may include IPC library 1266 and a second IPC driver of IPC driver(s) 1221 in shared kernel 320. In one of the first OS or the second OS, IPC calls are translated between the first IPC mechanism and the second IPC mechanism transparently such that processes in the two OSs see a direct IPC path to each other. In computing environment 1200, IPC translator 1242 is part of remote communication service 1241 of mobile OS 130. However, in other embodiments, IPC translation may be done in desktop OS 160, or implemented in a different manner within mobile OS 130.

To illustrate cross-environment inter-process communication using IPC translation, consider that mobile OS 130 uses a first IPC mechanism that is incompatible with a second IPC mechanism used by desktop OS 160. Shared kernel 320 may include IPC driver(s) 1221 that support both the first IPC mechanism and the second IPC mechanism. This means that processes within mobile OS 130 may communicate with each other through shared kernel 320 using the first IPC mechanism, using calls to IPC library 1236 and IPC transport through a first IPC driver of IPC driver(s) 1221. For example, applications 352 and 354 may communicate with service 1241 using the first IPC mechanism. Processes within desktop OS 160 may communicate with each other using the second IPC mechanism, for example using calls to IPC library 1266 and IPC transport through a second IPC driver of IPC driver(s) 1221. For example, applications 382 and 384 may communicate with each other over the second IPC mechanism.

In one embodiment, service 1241 is a remote communication service. Remote communication service 1241 provides a connection point for cross-environment IPC communication. For example, remote communication service 1241 may keep a directory or database of IPC communications. In the embodiments described above where a single IPC mechanism is used to communicate between applications in the first and second OS, the remote communication service establishes the link over the IPC mechanism between the applications by passing a reference to an IPC interface to each application. Once each application has a reference to an IPC interface, the applications effectively communicate through the instantiated IPC interface, without further involvement by the remote communication service. In this regard, the remote communication service acts as an IPC interface dealer, linking the applications through the instantiated IPC interfaces, which are then used by the applications to communicate across process boundaries in a thread-safe manner.

However, in embodiments where an application of the first OS uses a first IPC mechanism, and an application of the second OS uses a second IPC mechanism, the remote communication service maintains links to both applications through the different IPC mechanisms. The remote communication service then acts as an end-point for IPC communications from each application, and IPC translator 1244 translates the IPC calls between the two different and incompatible IPC mechanisms. The IPC translation occurring in the remote communication service is transparent to the applications which see the endpoint in the remote communication service as if it were the other party.

Consider, as an example, a first application (e.g., word processing application) running in an Android mobile OS and a second application (e.g., also a word processing application) running on a Linux OS, where the Linux and Android OSs run concurrently on a shared kernel. As with other Android applications, the first application has access to the Binder IPC mechanism within Android for inter-process communication (i.e., for communication to Android services). The Linux OS supports IPC but through different IPC mechanisms than Binder (e.g., unix domain sockets, UDP, etc.). The shared kernel supports communication using both Binder and the other IPC mechanisms of the Linux OS. Using IPC transport and IPC translation as described above, the first application can communicate with the second application through the remote communication service with IPC translation between Binder and a second IPC mechanism taking place in the IPC translator of the remote communication service.

Figure 13:
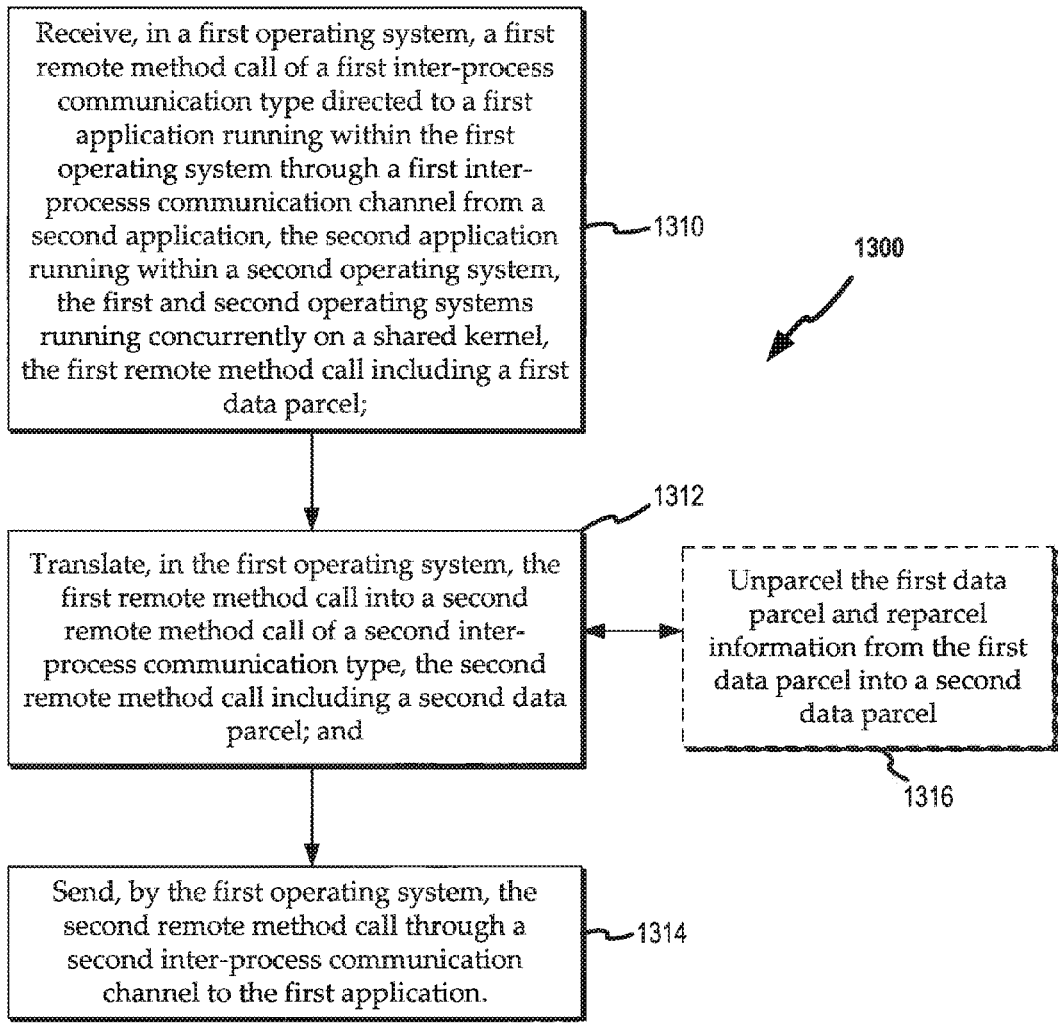
FIG. 13 illustrates a process flow for cross-environment communication using IPC translation, according to various embodiments.

FIG. 13 illustrates process flow 1300 for cross-environment communication using IPC translation, according to various embodiments. Process flow 1300 begins at block 1310, where a first OS (e.g., mobile OS 130) receives a first remote method call of a first inter-process communication type that includes a first data parcel. The first remote method call is directed to a first application running within the first OS through a first IPC channel (e.g., through IPC driver(s) 1221) from a second application, the second application running within a second OS (e.g., desktop OS 160), the first and second operating systems running concurrently on a shared kernel. At block 1312, the first OS translates the first remote method call into a second remote method call of a second inter-process communication type, the second remote method call including a second data parcel. At block 1314, the first OS sends the second remote method call through a second inter-process communication channel to the first application. As illustrated by block 1316, translating the first remote method call into the second remote method call may include unparceling the first data parcel and reparceling information of the first data parcel into the second data parcel of the second remote method call. As described above in reference to FIG. 12, IPC translation may be done within a service of the first OS. Alternatively, IPC translation may be done within a different component of the first OS or within the second OS.

Process flow 1300 describes IPC transport and translation of a remote method call from a second application running in a second OS to a first application running in a first OS. The IPC translator can similarly perform IPC translation for a reply message from the first application to the second application. For example, the remote method call may include a reply parameter or reply parcel. The second application may pass a remote method call return of the second inter-process communication type and the IPC translator may translate the return call to the first inter-process communication type for reception by the first application. The translation may include translating parameters and/or unparceling and reparceling data included in the IPC reply.

In embodiments, the IPC translator may translate between synchronous and asynchronous IPC calls. For example, the IPC translator may receive an asynchronous IPC call through a first IPC mechanism and translate the IPC call to a second, synchronous IPC call of a second IPC mechanism. The IPC translator may receive the return from the second, synchronous IPC call such that the IPC handling in the receiving process of the IPC call is unchanged. In various instances, the IPC translator may be able to translate between a synchronous call from a first process to an asynchronous call in a second process. For example, where the first process does not expect or operate on a return parcel, the IPC translator may be able to pass data from a first process using a synchronous IPC call to a second process using an asynchronous IPC call.

IPC transport and IPC translation may be used in a process flow similar to process flow 1300 to make a remote method call from the first application to the second application. Specifically, the first application may make a remote method call of the second inter-process communication type that is translated by the IPC translator and received in the second application as a remote method call of the first inter-process communication type. Accordingly, remote method calls may be performed from the first application to the second application or from the second application to the first application using different IPC mechanisms through the IPC translator.

In the embodiments described above, the remote communication service instantiates a generic IPC interface to link two applications. In other words, the remote communication service establishes the IPC link between applications but does not determine the purpose of the IPC communication or the information passed between applications including the structure of the parcel data that may be passed through the IPC interface. Further embodiments are directed to establishing an application programming interface through which categories of applications can communicate through category-specific remote communication calls. These embodiments may be employed whether the IPC communications take place over a single IPC mechanism as illustrated in FIGS. 7-11 or use the IPC transport with IPC translation embodiments illustrated in FIGS. 12 and 13.

Figure 14:
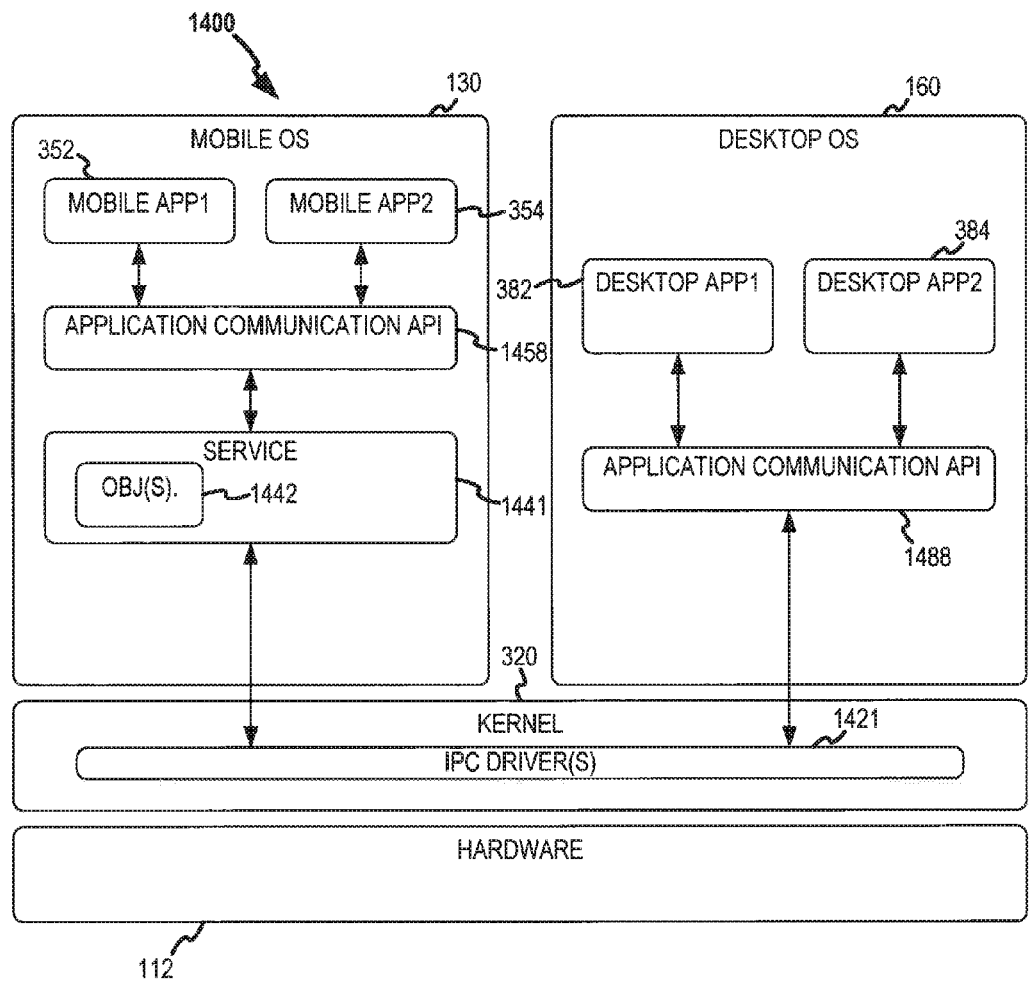
FIG. 14 illustrates a computing environment that uses an application programming interface layer to extend IPC interfaces to provide category specific remote communication calls, according to various embodiments.

FIG. 14 illustrates computing environment 1400 that uses an application programming interface layer to extend IPC interfaces to provide category specific remote communication calls, according to various embodiments. Computing environment 1400 includes similar components as computing environments 700 and 1200 illustrated above. Specifically, in computing environment 1400, mobile OS 130 and desktop OS 160 are running concurrently on shared kernel 320 of a mobile device. Applications 352 and 354 are running within mobile OS 130, and applications 382 and 384 are running within desktop OS 160. Mobile OS 130 includes remote communication service 1441 that manages IPC links, meaning that it passes references to IPC interfaces to requesting applications to link applications together over a common IPC interface. Computing environment 1400 also includes an application communication API 1458 within mobile OS 130, and an application communication API 1488 within desktop OS 160.

The application communication APIs of computing environment 1400 may be in application space within the first and/or second OS. For example, API 1458 could be implemented as a runtime library of mobile OS 130. In one embodiment, API 1458 is implemented as a JAR file for a Dalvik runtime environment of an Android mobile OS. In other embodiments, the application communication APIs of computing environment 1400 may be within user libraries or other libraries accessible to applications of the OS. For example, in one embodiment, API 1488 of desktop OS 160 is implemented as a shared user library in a Linux OS.

Application communication API 1458 of mobile OS 130 provides category specific remote calls that extend generic IPC interfaces as proxies (calls to another process) and sinks (calls from another process). Application communication API 1488 of desktop OS 160 provides corresponding remote calls (i.e., proxies that correspond to sinks within the other party). For example, API 1458 of mobile OS 130 may include sinks and proxies for a specific request of a specific category of application that perform all functionality required to request an IPC interface object 1442 from remote communication service 1441, and parcel data to the IPC interface object in a format tailored for the specific request.

The APIs may include remote calls for any category of application for which communication between applications may be desirable. This may include communication between applications running within the same OS, or cross-environment communication between applications running on separate and independent OSs. For example, categories of remote calls in APIs 1458 and 1488 may include browser applications, office productivity applications, email clients, games, location-enabled applications (e.g., GPS-enabled), augmented reality applications, and/or any other category for which communication between applications may provide a more seamless computing experience. API 1458 may be used by an application running on mobile OS 130 for communication with another application running on mobile OS 130, or for communication with applications running on desktop OS 160 through API 1488.

Consider that an application may be running on the mobile OS and the user may be interacting with the application through the user environment of the mobile OS while the mobile device is not docked. Through this user interaction, the application may acquire a particular application state (e.g., settings, views, and application data). The user then docks the mobile device with a secondary terminal environment. When the mobile computing device is docked, the desktop OS is associated with the secondary terminal environment. The user may desire to resume interaction, using an application of the desktop OS, with the application data and at the particular application state where the user left off with the corresponding application of the mobile OS. For example, the user may be using a spreadsheet application on the mobile OS before it is docked. When the user docks the mobile device the user may wish to open a spreadsheet program of the desktop OS through the secondary terminal environment and pick up in that program where they left off in the mobile spreadsheet application. The user may desire to do this without closing the file they are working on in the mobile spreadsheet application and re-opening the file using the desktop spreadsheet application. This requires communication between the mobile application and the desktop application of application data and application state information.

To provide this user experience, APIs 1458 and 1488 may include proxies and sinks for standard communication methods of spreadsheet applications to enable seamless transition of user data from a spreadsheet application running in the first OS (e.g., mobile OS) to a spreadsheet application running in the second OS (e.g., desktop OS). Specifically, API 1458 may provide sinks that receive requests for spreadsheet application state information and proxies that request spreadsheet application state information from remote sinks. For example, spreadsheet application state information may include application characteristics such as file name, sheet, active cell, and current sheet data. API 1488 includes corresponding proxies and sinks for desktop OS applications.

Figure 15:
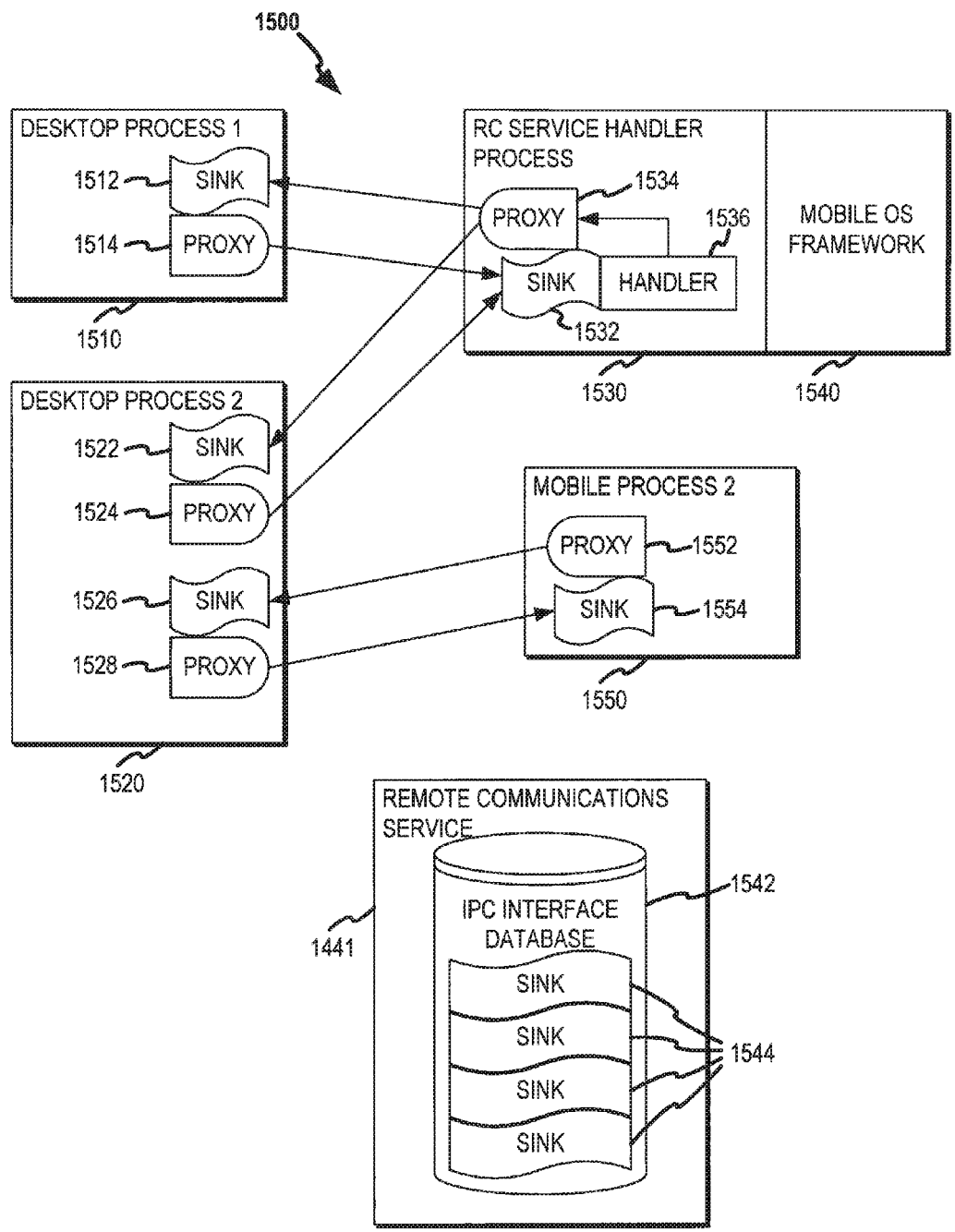
FIG. 15 illustrates a computing environment that implements application communication APIs to provide app-to-app communication, according to various embodiments.

FIG. 15 illustrates a computing environment 1500 that implements application communication APIs to provide app-to-app communication, according to various embodiments. In one example illustrated in FIG. 15, a process 1510 on the desktop OS (e.g., a process of an application running on desktop OS 160) talks to a handler implemented in the mobile OS using an application communication API. In this example, the first process 1510, running on the desktop OS, instantiates remote communications sink 1512 (e.g., using application communication API 1488 of the desktop OS). A handler process 1530 of the remote communication service of the mobile OS instantiates a proxy 1534 for communication to sink 1512 (e.g., using application communication API 1458 of the mobile OS). As illustrated in FIG. 15, handler process 1530 implements a handler 1536 for the mobile OS framework 1540.

Also illustrated in FIG. 15, a second process 1520 running within desktop OS (e.g., a process of the same application as process 1510, or of another application running on the desktop OS) communicates with processes of the mobile OS through proxies and sinks using the application communication API layers. Notably, as illustrated in FIG. 15, multiple proxies may call into the same sink. Specifically, proxy 1524 of process 1520, and proxy 1514 of process 1510, both call into sink 1532 of mobile OS process 1530. Also as illustrated in FIG. 15, proxy 1534 of mobile OS process 1530 calls into sink 1522 of desktop OS process 1520. Desktop OS process 1520 also communicates with mobile OS process 1550 through proxy 1528, which makes calls into sink 1554, and sink 1526, which receives calls from proxy 1552.

In computing environment 1500, remote communication service 1441 of mobile OS 130 maintains a database hold on remote communication sinks instantiated through application communication APIs. Remote communication service 1441 maintains an IPC interface database 1542 with holds on each sink(s) 1544. Any application, running on mobile OS 130 or desktop OS 160, can query a sink and make calls to the sink using a local proxy.

Figure 16:
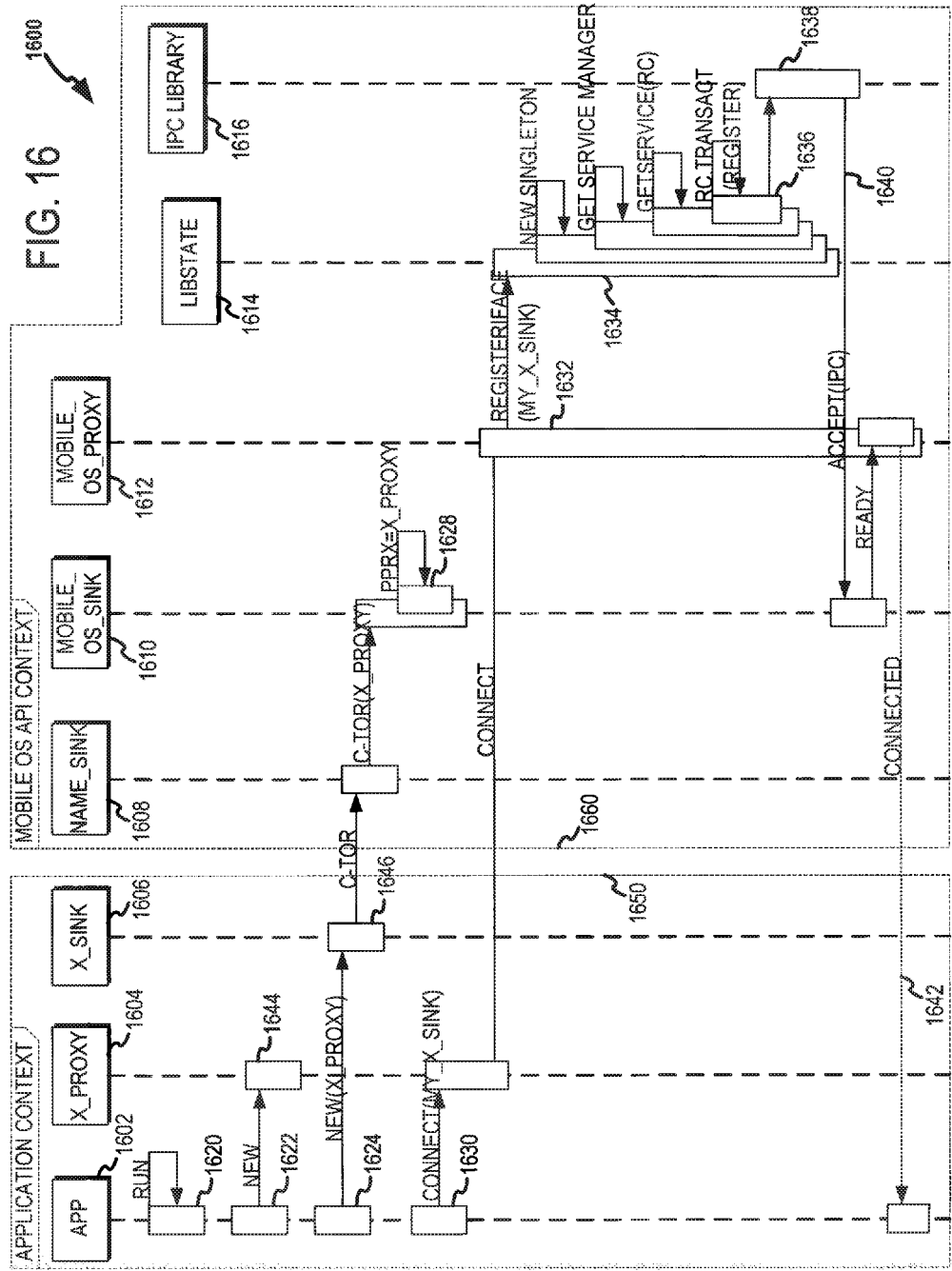
FIG. 16 illustrates a process flow for app-to-app communication through an application communication API, according to various embodiments.

FIG. 16 illustrates process flow 1600 for app-to-app communication through an application communication API, according to various embodiments. In process flow 1600, one or more applications running on mobile OS 130 or desktop OS 160 may establish a link between a proxy in one application and a sink in another application for passing application state information and/or application data. In process flow 1600, one or more applications instantiate proxies and sinks for remote communication. When an application instantiates a proxy or sink it is registered with the remote communication service of the mobile OS under the application name. In embodiments, the application name includes a root name (e.g., SPREADSHEET) that provides a key for the remote communication service to link proxies and sinks in the API context.

At block 1620 of process flow 1600, one or more application(s) 1602 begin execution. Application(s) 1602 may be one or more mobile OS applications (running within the mobile OS) and/or desktop OS applications (running within the desktop OS). At block 1622, an application instantiates a proxy 1644 of proxy class 1604 within application context 1640 for a remote communication request. At block 1624, an application instantiates a sink 1646 of sink class 1606 within application context 1640 for a remote communication request. As a result, in the mobile OS API context, name sink class 1608 and mobile OS sink class 1610 associate the sink with a key at block 1628. For example, the mobile OS sink class 1610 may associate the sink with a name key provided by the application.

At block 1630 of process flow 1600, an application connects the proxy 1644 to a sink to provide remote communication of application data and/or application state. At block 1632, the mobile OS proxy class 1612 registers the interface of the proxy with the named sink. At block 1634, library state class 1614 of the mobile OS API context establishes a connection to the remote communication service, which maintains a database hold on sinks. At block 1636, the proxy is registered through the remote communication service to establish a link to the sink. Upon registration at block 1638, the IPC interface of the sink is being pushed by the remote communication service. At block 1640, the mobile OS sink class accepts the IPC interface and at block 1642, the proxy is linked through the IPC interface to the sink. Notably, the API context provides the underlying registration and passing of IPC interfaces such that the applications do not need to be concerned with the underlying IPC transport. The application instantiates a proxy for a specific request of a named application and receives the requested data through the proxy.

Figure 17:
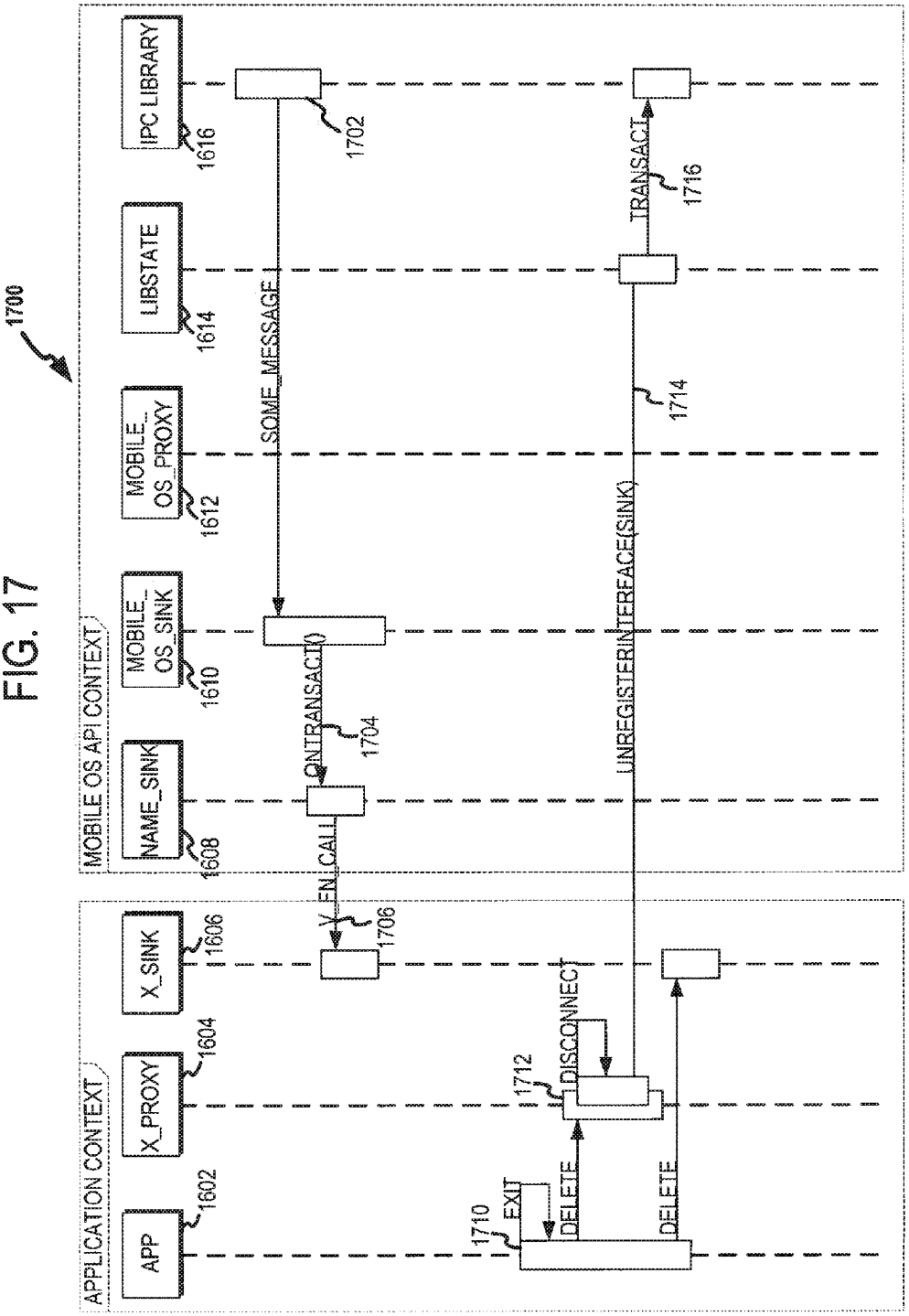
FIG. 17 illustrates a process flow that includes further aspects of app-to-app communication through an application communication API, according to various embodiments.

Process flow 1700 of FIG. 17 illustrates further aspects of app-to-app communication through an API, according to various embodiments. Process flow 1700 illustrates app-to-app communication through the API layers in response to an event. Process flow 1700 also illustrates unregistering of a proxy-sink interface. At block 1702 of process flow 1700, an incoming message is received over an IPC interface to a sink. This message invokes the remote method handler of the API sink class 1610 at block 1704. The remote method handler identifies the sink through the name sink class 1608 and makes a virtual function call into the sink at block 1706. This part of process flow 1700 illustrates that the API context handles the IPC transport including receiving the IPC call through the instantiated IPC interface. In the application context, the sink receives a virtual function call from the API context.

Blocks 1710, 1712, 1714, and 1716 illustrate unregistering a sink through the API. At block 1710, an event within an application results in the application unregistering proxies and/or sinks of the application. One event that may cause an application to unregisters proxies and/or sinks is exiting, as shown in block 1710. At block 1712, the proxy class in application context 1650 is disconnected from connected sinks Block 1714 shows the proxy being unregistered from a sink. At block 1716, the API calls into the IPC interface. On the remote side, this call will unregister the proxy (i.e., the remote communication service will unregister the proxy in the database hold on sinks).

Figure 18:
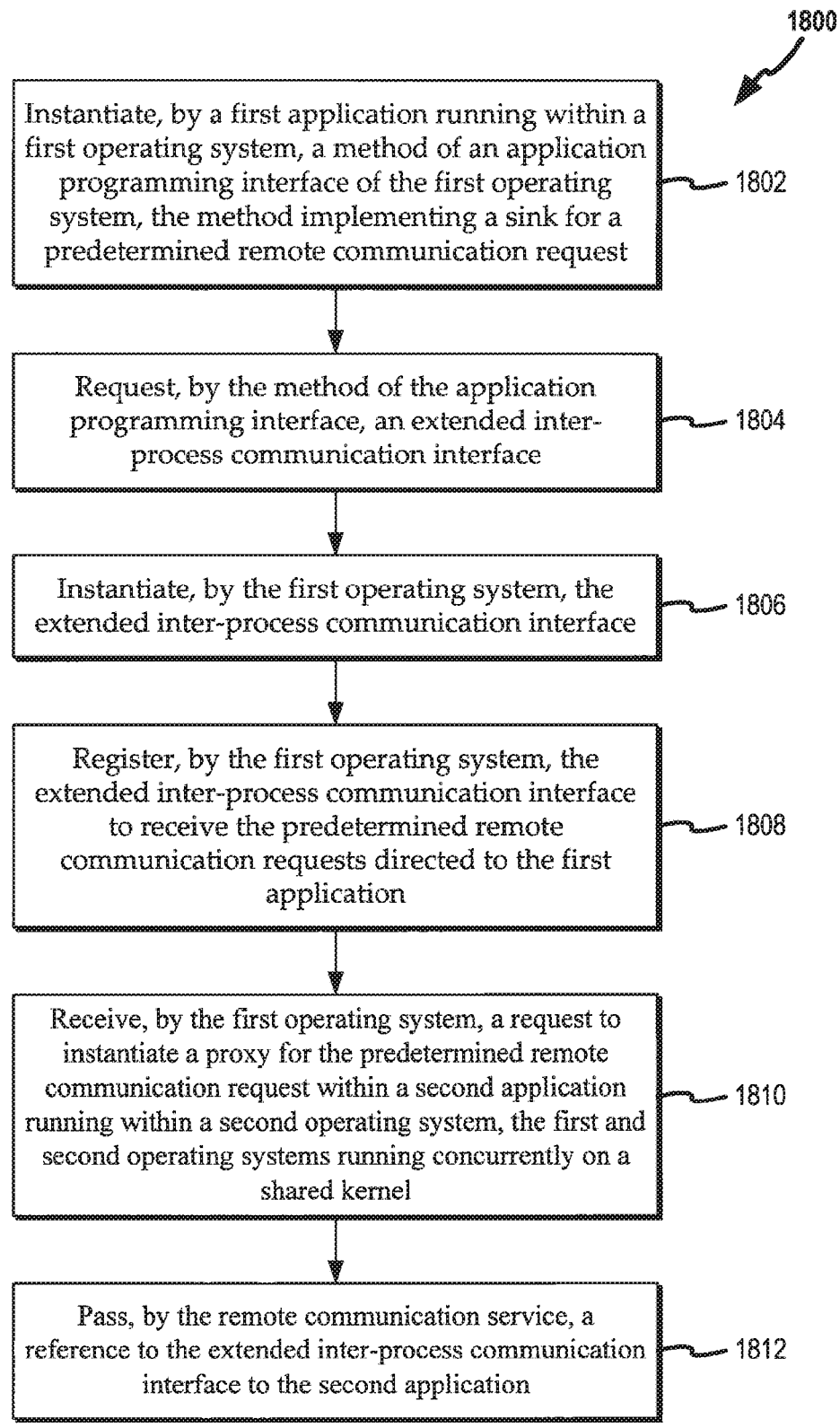
FIG. 18 illustrates a process flow for communication through an application communication API, according to various embodiments.

FIG. 18 illustrates process flow 1800 for communication through an application communication API, according to various embodiments. Method 1800 begins at block 1802, where a first application, running within a first OS (e.g., mobile OS), instantiates a method of an application programming interface of the first operating system, the method implementing a sink for a predetermined remote communication request. At block 1804, the method of the application programming interface requests an extended inter-process communication interface. At block 1806, the first operating system instantiates the extended inter-process communication interface. At block 1808, the first operating system registers the extended inter-process communication interface to receive the predetermined remote communication requests directed to the first application. At this point, the instantiated sink is available to receive requests from corresponding proxies of applications running in the first or the second OS.

At block 1810, the first operating system receives a request to instantiate a proxy for the predetermined remote communication request within a second application running within a second operating system, the first and second operating systems running concurrently on a shared kernel. At block 1812, the first operating system passes a reference to the extended inter-process communication interface to the second application. At this point the proxy in the second application is linked to the sink of the first application and requests through the proxy will be received and processed by the sink of the first application.

As described above, in one embodiment an Android mobile OS and a Linux desktop OS ("Hydroid") run concurrently on the same shared kernel of a single mobile computing device. The Android mobile OS provides a mobile computing experience through mobile computing hardware and the Linux desktop OS provides a desktop computing experience through a secondary terminal environment having a user experience profile associated with the Linux OS. However, other OS combinations are contemplated as within various embodiments of the invention. For example, various aspects of the invention may be used to run Windows Mobile and Windows 7 on a shared kernel or sharing common kernel-mode processes. As another example, iOS and Mac OS X running on a shared kernel is also within the scope of various embodiments. Furthermore, aspects of the invention may be used advantageously by combinations of embedded OSs and desktop or mobile OSs running on a shared kernel.

The foregoing description has been presented for purposes of illustration and description. Furthermore, the description is not intended to limit embodiments of the invention to the form disclosed herein. While a number of exemplary aspects and embodiments have been discussed above, those of skill in the art will recognize certain variations, modifications, permutations, additions, and sub-combinations thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/ or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method comprising:
   opening a first instance of a first application within a first operating system running on a mobile computing device;
   determining, the processor, that the first application is in a first application state;
   detecting, the processor, a docking event of the mobile computing device with a secondary terminal environment;
   opening a second application within a second operating system running on the mobile computing device, the second application also executing the first instance simultaneously with the first application, wherein the first and second applications are of a specific category of application, wherein the first application is a mobile application and the second application is a desktop application;
   instantiating, by the first application running within a within the first operating system, a method of an application programming interface of the first operating system, the method implementing a sink for a predetermined remote communication request;
   requesting, by the method of the application programming interface, an extended inter-process communication interface;
   instantiating, by the first operating system, the extended inter-process communication interface;
   registering, by the first operating system, the extended inter-process communication interface to receive the predetermined remote communication request directed to the first application;
   receiving, by the first operating system, a request to instantiate a proxy for the predetermined remote communication request within a in the second application running within the second operating system, the first and second operating systems running concurrently on a shared kernel;
   passing, by the first operating system, a reference to the extended inter-process communication interface to the second application, wherein the proxy in the second application is linked to the sink of the first application;
   receiving, by the processor, an input to the second application;
   processing, by the sink of the first application, a request from the proxy of the second application; and
   determining, by the processor, that the first application is in a second application state.

2. The method of claim 1, wherein the predetermined remote communication request is specific to a category of applications that includes the first and second applications.

3. The method of claim 1, wherein the sink obtains a connected endpoint of an inter-process communication interface instantiated by a remote communication service of the first operating system.

4. The method of claim 1, further comprising
receiving, by the first operating system, a request to instantiate a second proxy for the predetermined remote communication request within a third application; and
passing, by the first operating system, the reference to the extended inter-process communication interface to the third application.

5. The method of claim 1, wherein the registering of the extended inter-process communication interface by the first operating system includes associating the inter-process communication with a name key of the application.

6. A mobile computing device, comprising:
a memory;
a processor in communication with the memory, the processor operable to: execute a first operating system and a second operating system, the first and second operating systems running concurrently on a shared kernel;
open a first instance of a first application within the first operating system; determine that the first application is in a first application state; detect a docking event of the mobile computing device with a secondary terminal environment; open a second application within the second operating system, the second application also executing the first instance simultaneously with the first application, wherein the first and second applications are of a specific category of application, wherein the first application is a mobile application and the second application is a desktop application;
instantiate, by the first application, a sink for a predetermined remote communication request;
instantiate, by the second application a proxy for the predetermined remote communication request; and
establish a remote communication service of the first operating system, the remote communication service establishing a connection between the proxy and the sink through an extended inter-process communication interface;
receive an input to the second application;
process, by the sink of the first application, a request from the proxy of the second application; and
determine, by the processor, that the first application is in a second application state.

7. The mobile computing device of claim 6, wherein the sink comprises a method of an application programming interface of the first operating system.

8. The mobile computing device of claim 7, wherein the application programming interface is provided within an application space of the first operating system.

9. The mobile computing device of claim 7, wherein the application programming interface comprises classes of sinks, the classes of sinks associated with categories of applications.

10. The mobile computing device of claim 7, wherein the application programming interface comprises a java archive file.

11. The mobile computing device of claim 7, wherein the method of the application programming interface requests the extended inter-process communication interface from the remote communication service.

12. The mobile computing device of claim 6, wherein the remote communication service registers the sink to receive inter-process communication through the extended inter-process communication interface.

13. The mobile computing device of claim 12, wherein upon registration by the remote communication service, the extended inter-process communication interface is pushed by the remote communication service.

14. The mobile computing device of claim 6, wherein the first operating system comprises an Android mobile operating system and the second operating system comprises a Linux operating system.

15. A non-transitory computer readable storage medium having stored thereon instructions that cause a processor to execute a method, the method comprising the steps of:
opening a first instance of a first application within a first operating system running on a mobile computing device;
determining, by the processor, that the first application is in a first application state;
detecting, by the processor, a docking event of the mobile computing device with a secondary terminal environment;
opening a second application within a second operating system running on the mobile computing device, the second application also executing the first instance simultaneously with the first application, wherein the first and second applications are of a specific category of application, wherein the first application is a mobile application and the second application is a desktop application;
instantiating, by the first application running within a within the first operating system, a method of an application programming interface of the first operating system, the method implementing a sink for a predetermined remote communication request;
requesting, by the method of the application programming interface, an extended inter-process communication interface;
instantiating, by the first operating system, the extended inter-process communication interface;
registering, by the first operating system, the extended inter-process communication interface to receive the predetermined remote communication request directed to the first application;
receiving, by the first operating system, a request to instantiate a proxy for the predetermined remote communication request in the second application running within a within the second operating system, the first and second operating systems running concurrently on a shared kernel;
passing, by the first operating system, a reference to the extended inter-process communication interface to the second application, application, wherein the proxy in the second application is linked to the sink of the first application;
receiving, by the processor, an input to the second application;
processing, by the sink of the first application, a request from the proxy of the second application; and
determining, by the processor, that the first application is in a second application state.

16. The non-transitory computer readable medium of claim 15, wherein the predetermined remote communication request is specific to a category of applications that includes the first and second applications.

17. The non-transitory computer readable medium of claim 15, wherein the sink obtains a connected endpoint of an inter-process communication interface instantiated by a remote communication service of the first operating system.

18. The non-transitory computer readable medium of claim 15, further comprising:
receiving, by the first operating system, a request to instantiate a second proxy for the predetermined remote communication request within a third application; and passing, by the first operating system, the reference to the extended inter-process communication interface to the third application.

19. The non-transitory computer readable medium of claim 15, wherein:
applications running within the first operating system use the method of the application programming interface for inter-process communication; and
applications running within the second operating system use a second method of a second application programming interface of the second operating system for inter-process communication.

20. The non-transitory computer readable medium of claim 15, further comprising:
receiving, by the first operating system, a first remote communication request through the extended inter-process communication interface, the first remote communication request directed to the first application, the first remote communication request including a first data parcel;
translating, in the first operating system, the first remote communication request into a second remote communication request, wherein the translating includes unparceling the first data parcel and reparceling data into a second data parcel included in the second remote communication request; and
sending, by the first operating system, the second remote communication request to the first application.

21. The non-transitory computer readable medium of claim 20, wherein the first remote communication request is a synchronous remote communication request and the second remote communication request is an asynchronous remote communication request.

\* \* \* \* \*

UNITED STATES PATENT AND TRADEMARK OFFICE
CERTIFICATE OF CORRECTION

| | |
|---|---|
| PATENT NO. | : 9,063,798 B2 |
| APPLICATION NO. | : 14/068662 |
| DATED | : June 23, 2015 |
| INVENTOR(S) | : Laszlo Csaba Benedek and Octavian Chincisan |

Page 1 of 1

It is certified that error appears in the above-identified patent and that said Letters Patent is hereby corrected as shown below:

In the Claims

At Column 30, line 17, after "determining," please insert --by-- therein.

At Column 30, line 19, after "detecting," please insert --by-- therein.

At Column 30, line 31, please delete "within a" therein.

At Column 30, line 47, please delete "within a" therein.

At Column 32, line 24, please delete "within a" therein.

At Column 32, line 46, please delete the second occurrence of "application," therein.

Signed and Sealed this
First Day of March, 2016

Michelle K. Lee
*Director of the United States Patent and Trademark Office*